US011393174B2

(12) United States Patent
Fillhardt et al.

(10) Patent No.: US 11,393,174 B2
(45) Date of Patent: *Jul. 19, 2022

(54) COOPERATIVE AUGMENTED REALITY MAP INTERFACE

(71) Applicant: Apple Inc., Cupertino, CA (US)

(72) Inventors: Nathan L. Fillhardt, Scotts Valley, CA (US); Syed Mohsin Hasan, Sunnyvale, CA (US); Adrian P. Lindberg, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,344

(22) Filed: Sep. 4, 2020

(65) Prior Publication Data
US 2020/0402319 A1 Dec. 24, 2020

Related U.S. Application Data

(63) Continuation of application No. 15/867,351, filed on Jan. 10, 2018, now Pat. No. 10,777,007.
(Continued)

(51) Int. Cl.
*G06T 19/00* (2011.01)
*G06T 15/00* (2011.01)
(Continued)

(52) U.S. Cl.
CPC ............ *G06T 19/006* (2013.01); *G06F 16/29* (2019.01); *G06T 7/74* (2017.01); *G06T 15/00* (2013.01);
(Continued)

(58) Field of Classification Search
CPC ..... G06T 19/006; G06T 19/003; G06T 15/00; G06T 7/74; G06T 17/05; G06T 2200/24;
(Continued)

(56) References Cited

U.S. PATENT DOCUMENTS 6,288,704 B1    9/2001   Flack et al.
8,823,697 B2    9/2014   Woo et al.
(Continued)

FOREIGN PATENT DOCUMENTS

CN    101505376 A    8/2009
CN    101978394 A    2/2011
(Continued)

OTHER PUBLICATIONS

Final Office Action issued in U.S. Appl. No. 15/867,351, dated Jul. 9, 2019 in 28 pages (of-record in parent application).
(Continued)

*Primary Examiner* — Grace Q Li
(74) *Attorney, Agent, or Firm* — Kilpatrick, Townsend and Stockton LLP

(57) ABSTRACT

To reduce this amount of bandwidth needed to share 3D map images between mobile devices, according to some embodiments, a user's mobile device (i.e., a host device) may identify its origin in a 3D map and a current virtual camera position relative to the origin based on the physical position of the mobile device. The mobile device may send both the origin and the virtual camera position to another mobile device (i.e., a client device) for use in rendering a corresponding image. Separately, the client device may download the 3D map images from a server, e.g., in preparation for a meeting. In this manner, the host device may send the origin to the client device once, as well as send a data stream of the current virtual camera position for use in accessing the corresponding 3D map images at the client device.

20 Claims, 19 Drawing Sheets

Related U.S. Application Data

(60) Provisional application No. 62/566,184, filed on Sep. 29, 2017.

(51) Int. Cl.
| | | |
|---|---|---|
| *G06F 16/29* | (2019.01) | |
| *G06T 7/73* | (2017.01) | |
| *G06T 17/05* | (2011.01) | |
| *H04W 4/02* | (2018.01) | |
| *H04L 67/131* | (2022.01) | |
| *H04L 67/01* | (2022.01) | |

(52) U.S. Cl.
CPC ............ *G06T 17/05* (2013.01); *G06T 19/003* (2013.01); *H04L 67/38* (2013.01); *H04W 4/02* (2013.01); *G06T 2200/24* (2013.01); *G06T 2207/30244* (2013.01); *G06T 2219/024* (2013.01); *H04L 67/42* (2013.01)

(58) Field of Classification Search
CPC ... G06T 2207/30244; G06T 2219/024; H04W 4/02; G06F 16/29
See application file for complete search history.

(56) References Cited

U.S. PATENT DOCUMENTS

| | | | |
|---|---|---|---|
| 9,013,550 | B2 | 4/2015 | Jiang et al. |
| 9,508,146 | B2 | 11/2016 | Davies et al. |
| 9,558,557 | B2 | 1/2017 | Jiang et al. |
| 10,643,373 | B2 | 5/2020 | Fillhardt et al. |
| 2008/0297474 | A1 | 12/2008 | Blomqvist et al. |
| 2010/0275122 | A1 | 10/2010 | Buxton et al. |
| 2011/0169946 | A1 | 7/2011 | Rudin et al. |
| 2011/0248995 | A1* | 10/2011 | Vaughan ............... G06T 19/006 345/420 |
| 2012/0041675 | A1 | 2/2012 | Juliver et al. |
| 2012/0120101 | A1 | 5/2012 | Adhikari et al. |
| 2012/0249416 | A1 | 10/2012 | Maciocci et al. |
| 2013/0038609 | A1 | 2/2013 | Tsai et al. |
| 2013/0125027 | A1 | 5/2013 | Abovitz |
| 2013/0178257 | A1 | 7/2013 | Langseth |
| 2013/0322702 | A1 | 12/2013 | Piemonte et al. |
| 2014/0229287 | A1 | 8/2014 | Ben-david et al. |
| 2014/0267399 | A1 | 9/2014 | Zamer |
| 2014/0267411 | A1 | 9/2014 | Fein et al. |
| 2014/0278847 | A1 | 9/2014 | Gallo |
| 2015/0070347 | A1 | 3/2015 | Hofmann et al. |
| 2015/0323327 | A1 | 11/2015 | Lord et al. |
| 2015/0334012 | A1 | 11/2015 | Butler et al. |
| 2015/0362520 | A1 | 12/2015 | Wells et al. |
| 2016/0214016 | A1 | 7/2016 | Stafford |
| 2016/0217614 | A1 | 7/2016 | Kraver et al. |
| 2016/0240010 | A1 | 8/2016 | Rosenthal et al. |
| 2016/0300389 | A1 | 10/2016 | Glenn, III et al. |
| 2017/0094161 | A1 | 3/2017 | Graham et al. |
| 2017/0168566 | A1 | 6/2017 | Osterhout et al. |
| 2018/0088339 | A1 | 3/2018 | Aruga |
| 2018/0128636 | A1* | 5/2018 | Zhou .................. G01C 21/3697 |
| 2018/0367839 | A1 | 12/2018 | Vandoros |
| 2019/0179423 | A1 | 6/2019 | Rose et al. |

FOREIGN PATENT DOCUMENTS

| | | |
|---|---|---|
| CN | 103460256 A | 12/2013 |
| CN | 103971392 A | 8/2014 |
| CN | 104335248 A | 2/2015 |
| CN | 105009039 A | 10/2015 |
| CN | 105188516 | 12/2015 |
| CN | 105247575 A | 1/2016 |
| CN | 106575153 A | 4/2017 |
| CN | 106575209 | 4/2017 |
| EP | 0838787 | 4/1998 |
| EP | 1915588 | 4/2008 |
| WO | 2015010165 | 1/2015 |
| WO | 2015145139 | 5/2015 |
| WO | 2015192117 | 12/2015 |
| WO | 2016076951 | 5/2016 |

OTHER PUBLICATIONS

Non-Final Office Action issued in U.S. Appl. No. 15/867,351, dated Jan. 2, 2020 in 18 pages (of-record in parent application).
Non-Final Office Action issued in U.S. Appl. No. 15/867,351, dated Mar. 28, 2019 in 22 pages (of-record in parent application).
Notice of Allowance issued in U.S. Appl. No. 15/867,351, dated May 12, 2020 in 5 pages (of-record in parent application).
Corrected Notice of Allowability issued in U.S. Appl. No. 15/981,847, dated Feb. 10, 2020 in 2 pages (of-record in parent application).
Final Office Action issued in U.S. Appl. No. 15/981,847, dated Sep. 18, 2019 in 20 pages (of-record in parent application).
Non-Final Office Action issued in U.S. Appl. No. 15/981,847, dated Apr. 5, 2019 in 15 pages (of-record in parent application).
Notice of Allowance issued in U.S. Appl. No. 15/981,847, dated Jan. 6, 2020 in 9 pages (of-record in parent application).
Office Action issued in China Application No. CN201821405845.9, dated Mar. 12, 2019 in 2 pages (of-record in parent application).
Office Action issued in China Application No. CN201821405845.9, dated May 14, 2019 in 2 pages (of-record in parent application).
Office Action issued in China Application No. CN201821405845.9, dated Feb. 1, 2019 in 6 pages (of-record in parent application).
International Preliminary Report on Patentability issued in PCT Application No. PCT/US2018/033053, dated Jan. 2, 2020 in 10 pages (of-record in parent application).
International Search Report and Written Opinion issued in PCT Application No. PCT/US2018/033053, dated Aug. 10, 2018 in 13 pages (of-record in parent application).
International Preliminary Report on Patentability issued in PCT Application No. PCT/US2018/044290, dated Apr. 9, 2020 in 13 pages (of-record in parent application).
International Search Report and Written Opinion issued in PCT Application No. PCT/US2018/044290, dated Jan. 21, 2019 in 18 pages (of-record in parent application).
Invitation to Pay Additional Fees and, Where Applicable, Protest Fee issued in PCT Application No. PCT/US2018/044290, dated Nov. 12, 2018 in 13 pages (of-record in parent application).
Article: Chao, et al., "Research on the Integrational Technique of Cartography and Virtual Reality System", Institute of Land Science, dated May 2002, pp. 86-88.
Office Action issued in China Application No. CN201810534369.9, dated Jun. 30, 2021 in 11 pages.
Article: Haomin, et al., "A Survey of Monocular Simultaneous Localization and Mapping", Journal of Computer-Aided Design & Computer Graphics, vol. 28, No. 6, dated Jun. 2016, pp. 855-868.
Article: Seo, "Weakly Calibrated Video-Based Augmented Reality: Embedding And Rendering Through Virtual Camera", International Symposium on Augmented Reality, dated Feb. 28, 2000 in 8 pages.
Office Action issued in European Application No. EP18732520.4, dated Dec. 21, 2021 in 7 pages.
Office Action issued in China Application No. CN201810534369.9, dated Mar. 21, 2022 in 5 pages.

\* cited by examiner

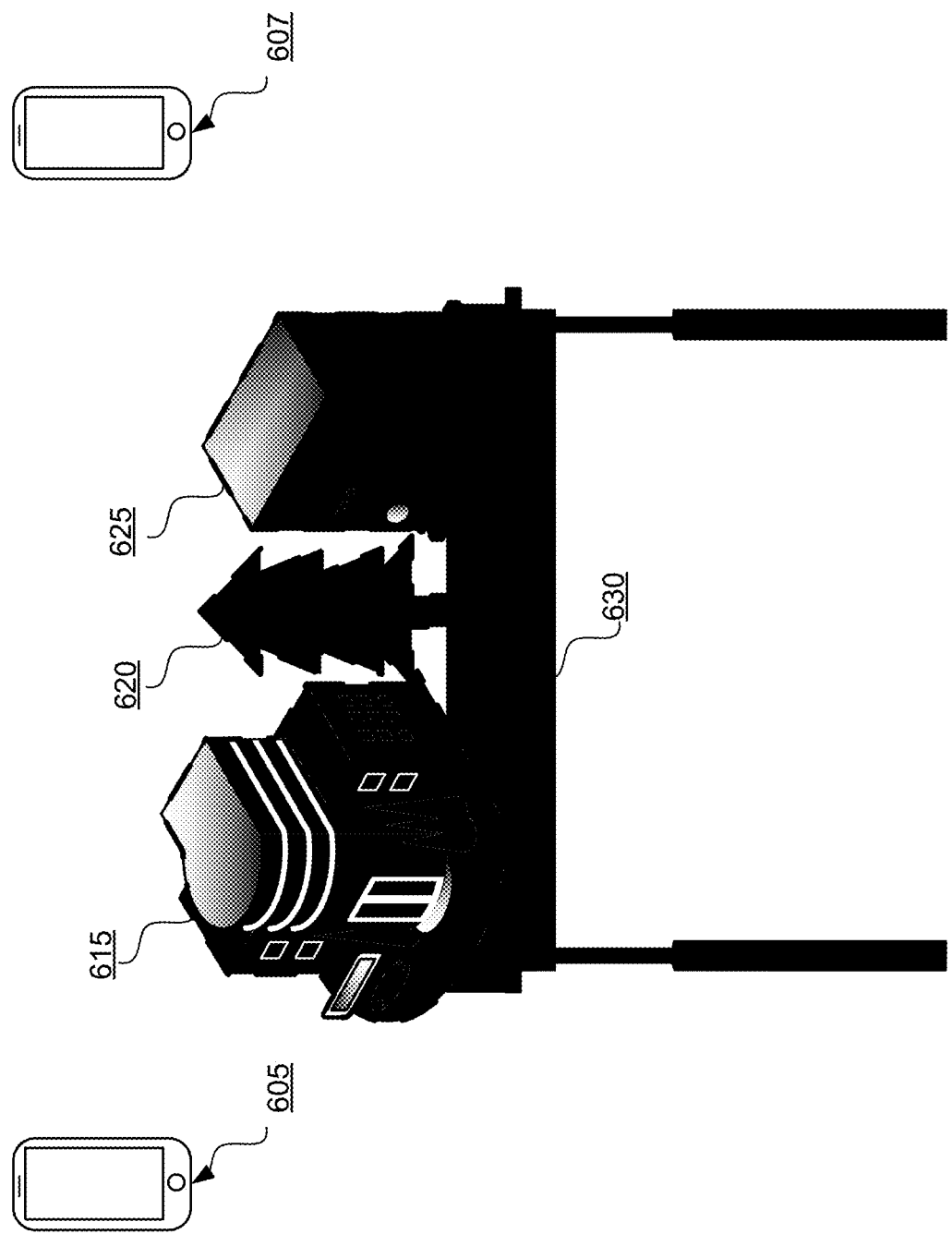

COOPERATIVE AUGMENTED REALITY MAP INTERFACE

CROSS-REFERENCES TO RELATED APPLICATIONS

This application is a continuation of U.S. application Ser. No. 15/867,351 entitled "Cooperative Augmented Reality Map Interface," which claims the benefit of U.S. Provisional Application No. 62/566,184, filed Sep. 29, 2017, entitled "Cooperative Augmented Reality Map Interface," the disclosure of this application is incorporated by reference herein in their entirety and for all purposes. This disclosure is also related to U.S. Provisional Application No. 62/521,895, filed Jun. 19, 2017, the disclosure of which is incorporated by reference herein in its entirety.

BACKGROUND

Modern phones can provide location information via a map application. The view of a map is typically a top down view (i.e., an overhead view) of a grid of streets. The top down view may also provide a satellite image. When a user is at a particular view of a map, the user may wish to have a three dimensional (3D) view. The 3D view can be provided from a perspective of a virtual camera. Typically, the position of the virtual camera is specified via a touchscreen interface through gestures (i.e., a touch, a drag, a rotation, etc.).

BRIEF SUMMARY

It may be convenient to view a 3D map on a mobile device (e.g., a phone) where the location of the mobile device changes the view of the 3D map by moving the perspective of the virtual camera, e.g., via an augmented reality (AR) interface or a virtual reality (VR) interface. The VR interface may display the 3D map, while the AR interface may have an overlay of the 3D map on camera images captures by the phone.

A user of a mobile device may want to send his or her particular view of the 3D map from his or her mobile device to another user's mobile device in order to share the particular view. For example, a city planner may want to take someone on a virtual guided tour of a 3D map, where the images are generated using the user interface. Such user-generated videos may be transmitted over a network, which may use a large amount of bandwidth. Thus, some embodiments provide systems and methods of sharing 3D map views at a reduced bandwidth.

In some embodiments, a method is provided. The method comprises a client device retrieving a set of map objects corresponding to a region of a map. In some embodiments, the map may be a three-dimensional (3D) map. The client device may receive an origin position in the region of the map over a network. The client device may receive, over a network, a stream of virtual positions of the host device in the map. The virtual map may be 6D positions. The client device may render and display a series of images of the map using the stream of virtual positions of the host device. The client device may use the stream of virtual positions to determine which map objects to retrieve from memory and display.

In some embodiments, a method for implementing a cooperative discovery mode on a map interface of a mobile device are provided. A selection of a discovery mode may be received via a user interface of a client device. The discovery mode may indicate, for example, that the client device does not want to follow the virtual positions of a host device, and instead wants to navigate map images independently. One or more first images of a physical environment within which the client device resides may be captured using a physical camera of the client device. An initial position of the physical camera in the physical environment may be determined using the one or more first images. The initial position of the physical camera can be defined relative to an origin position in the physical environment. A set of physical positions of a set of 3D objects of a 3D map relative to the initial position may be specified based on an origin position from a host device and a set of map objects from a map server. The set of three-dimensional objects may correspond to the set of map objects. A stream of virtual positions of a client virtual camera corresponding to the client device may be generated based on physical movement of the client device as measured using one or more second images of the physical environment. In other words, the physical movement of the client device may be determined by consecutive images taken by the physical camera of the client device. A series of images of the 3D map may be rendered and displayed using the stream of virtual positions of the client virtual camera. In this case, the physical movement of the client device to be closer to the computer may be translated into a zoomed-in view of the three-dimensional map. Thus, movement of the client device can allow a user to control what parts of a map (e.g., a three-dimensional map) are displayed on the mobile device. This control of what is displayed on the client device may be independent of what is being displayed on the host device, in some embodiments In some embodiments, a method of providing a view of a three-dimensional (3D) map on a display of a client device is provided. The method comprises performing, by the client device having a physical camera communicably coupled with the display: retrieving, from a map server, a step of map objects corresponding to a region of the 3D map; receiving, over a network, an origin position in the region of the 3D map, the origin position being specified by a host device; receiving, over the network, a first stream of virtual positions of a host virtual camera corresponding to the host device in the 3D map, wherein the virtual positions are relative to the origin position and are generated by physical movement of the host device; rendering and displaying a first series of images of the 3D map using the first stream of virtual positions of the host device; and providing a user interface for a user to select a discovery mode that uses the physical camera. The method further comprises, in response to a selection of the discovery mode via the user interface: capturing one or more first images of a physical environment within which the client device resides using the physical camera; determining an initial position of the physical camera in the physical environment using the one or more first images; specifying a set of physical positions of a set of 3D objects of the 3D map relative to the initial position based on the origin position and the set of map objects; and generating a second stream of virtual positions of a client virtual camera corresponding to the client device based on physical movement of the receiving mobile device as measured using one or more second images from the physical camera. The method further comprises rendering and displaying a second series of images of the 3D map using the second stream of virtual positions of the client virtual camera.

In some embodiments, a mobile device is provided. The mobile device comprises a display, a physical camera communicably coupled with the display, a processor and a memory coupled to the processor, the memory storing instructions, which when executed by the processor, cause the mobile device to perform operations including the steps of the disclosed methods, for example.

In some embodiments, a computer-program product is provided. The computer-program product is tangibly embodied in a non-transitory machine-readable storage medium of a host device, including instructions that, when executed by one or more processors, cause the one or more processors to perform operations including the steps of the disclosed methods, for example.

The following detailed description together with the accompanying drawings in which the same reference numerals are sometimes used in multiple figures to designate similar or identical structural elements, provide a better understanding of the nature and advantages of the present disclosure.

BRIEF DESCRIPTION OF THE DRAWINGS

FIG. 6A shows a diagram depicting a client device and a host device being used to view an augmented reality map as if a three-dimensional map existed in a room according to some embodiments of the present invention.

DETAILED DESCRIPTION

Figure 1:
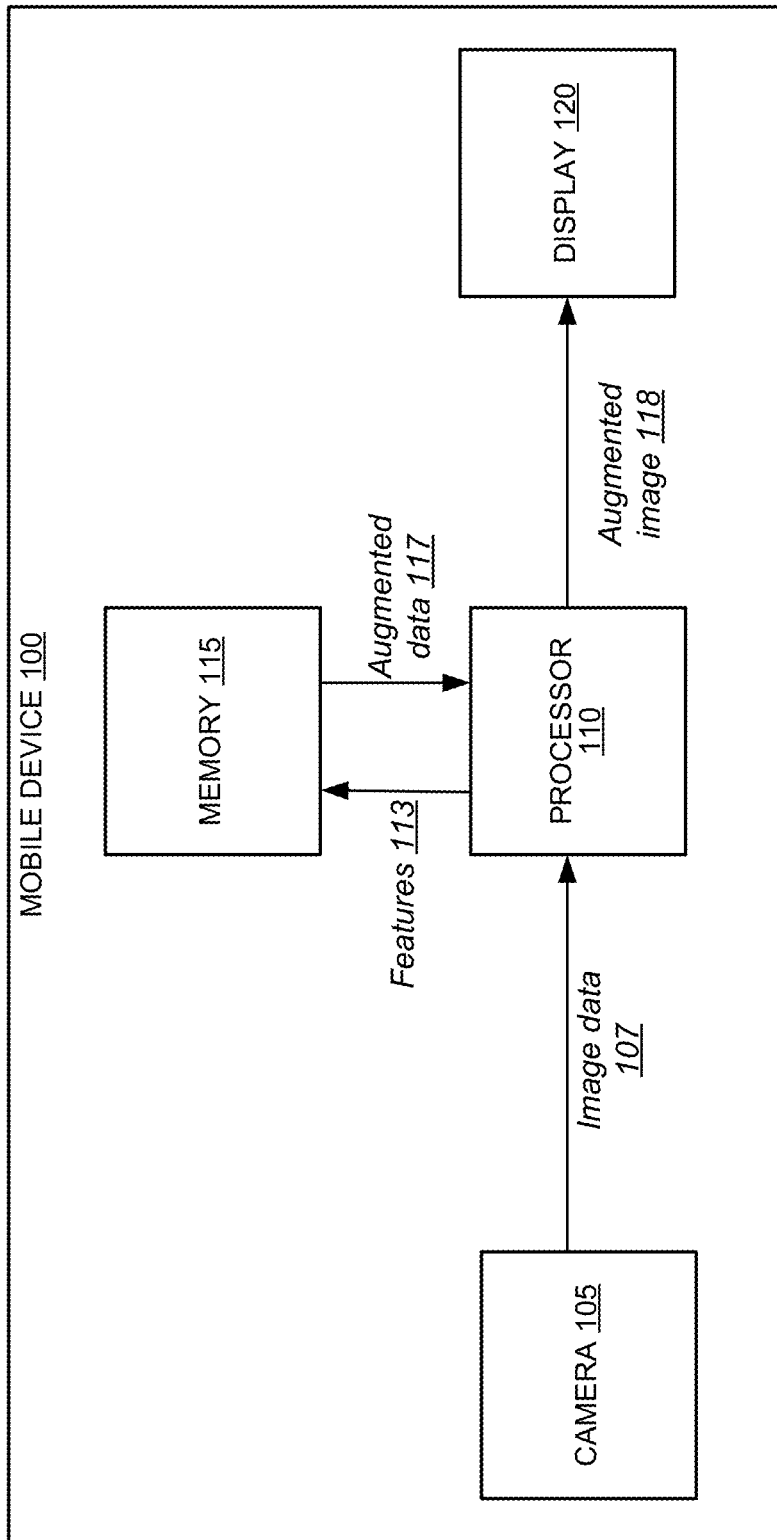
FIG. 1 shows a block diagram depicting a mobile device implementing augmented reality according to some embodiments of the present invention.

To reduce the amount of bandwidth needed to share 3D map images between mobile devices (as may be generated using a position with orientation of a mobile device), a user's mobile device (i.e., a host device) can identify its origin in a 3D map and a current virtual camera position relative to the origin based on the physical position of the mobile device. The mobile device may send both the origin and the virtual camera position to another mobile device (i.e., a client device) for use in rendering a corresponding image. Separately, the client device may download the 3D map images from a server, e.g., in preparation for a meeting. In this manner, the host device may send the origin to the client device once, as well as send a data stream of the current virtual camera position for use in accessing the corresponding 3D map images at the client device. This mode may be referred to herein as a "follower mode".

In addition, in some embodiments, the client device may have an option to control its own view of the 3D map images. In such an option, the current virtual camera position of the host device in the 3D map may be displayed (e.g., some marker or icon can be displayed, potentially with an orientation indicator). In this manner, the client device may view what its user wants to see, while still being aware of what the user of the host device is seeing. In addition, the view of the client device may be able to be aligned with the view of the host device based on the displayed location of the host device. This mode may be referred to herein as a "discovery mode".

In some embodiments, the host device and the client device may move in and out of the follower mode and the discovery mode. In the discovery mode, the host device's position may be displayed as a trace over time, showing a path of the host device. Such a path may be considered a "tour guide path". The client device may leave and re-enter along such a tour guide path at various positions along that path, while still having the freedom to discover other portions of the 3D map.

Embodiments of the present invention provide a number of advantages. For example, new users of map applications may find traditional methods of manipulating maps to be difficult. A user may be familiar with one-finger manipulations, but may be unfamiliar with more complicated two-finger manipulations. Thus, some embodiments of the invention provide an interface for interacting with a displayed map that is easy and intuitive, allowing users to interact with the displayed map by moving the mobile device. In addition, users may share their interactions with the displayed map on the mobile device through coordination with another mobile device. This may make it unnecessary to share potentially multiple different addresses, coordinates, or points of interest between users, and allow one user to simply "follow" another user's interactions with the map.

I. AUGMENTED AND VIRTUAL REALITY

Augmented reality describes a technology in which a live view of the real world is supplemented with computer-generated data, such as text, graphics, or audio. In other words, the real world as seen by an augmented reality device is enhanced with additional features. With the use of augmented reality, the real world may become interactive and informative. For example, information about an object in a real-world scene may be overlaid onto the real-world scene to provide the user with more information about the viewed object.

Virtual reality describes a technology in which a computer-generated simulation of an image may be interacted with using real world movements, gestures or actions. For example, realistic images may be used to simulate a user's presence in a virtual environment. The user may be able to interact with the virtual environment, such as by turning his head to look around the virtual environment, or by extending his hand toward a virtual item to virtually touch or move the item.

In some embodiments, augmented or virtual reality may be implemented on a mobile device. FIG. 1 shows a block diagram depicting a mobile device 100 implementing augmented reality according to some embodiments of the present invention. In some embodiments, the mobile device 100 may be a communication device that may provide remote communication capabilities to a network. Examples of remote communication capabilities include using a mobile phone (wireless) network, wireless data network (e.g., 3G, 4G or similar networks), WiFi, Wi-Max, or any other communication medium that may provide access to a network such as the Internet or a private network. Examples of mobile devices 100 include mobile phones (e.g., cellular phones), PDAs, tablet computers, net books, laptop computers, personal music players, handheld specialized readers, watches, fitness bands, wearables, etc., as well as automobiles with remote communication capabilities. The mobile device 100 may comprise any suitable hardware and software for performing such functions, and may also include multiple devices or components (e.g., when a device has remote access to a network by tethering to another device—i.e., using the other device as a modem—both devices taken together may be considered a single communication device).

The mobile device 100 may include hardware components, such as a camera 105, a processor 110, a memory 115, and a display 120. Although illustrated and described as being internal to the mobile device 100, it is contemplated that any or all of these hardware components may alternatively or additionally be implemented external to and/or remote from the mobile device 100. To implement augmented reality, the camera 105 may be used to capture image data 107 of a real-world view. For example, the camera 105 may capture a moveable image of the environment positioned in front of the camera 105 at a given moment. The camera 105 may transmit the image data 107, as a single image or a video, to the processor 110. The camera 105 may be a physical camera.

The processor 110 may process the image data 107 to extract features 113 from the image data 107. The processor 110 may analyze the image data 107 to determine whether particular objects are present in the image data 107. For example, the processor 110 may run a classifier on the image data 107 to identify images of people in the image data 107 based on common features of people (e.g., a head, a face, a body, arms, legs, hands, feet, typical movement profiles, etc.). Similarly, the processor 110 may run a classifier on the image data 107 to identify other particular objects present in the image data 107. These identified objects may be passed as features 113 to the memory 115.

The processor 110 may use the features 113 to retrieve augmented data 117 from the memory 115. For example, a feature 113 may be "dog". As facilitated by the processor 110, the memory 115 may be searched for database entries corresponding to "dog". One or more of the database entries may be passed back to the processor 110 as augmented data 117. The augmented data 117 may include any data relevant to the features 113, such as text (e.g., a description, a definition, a website address, etc.), a graphic, audio, video, an interactive element, and/or the like.

The processor 110 may receive the augmented data 117 and overlay the augmented data 117 onto the image data 107. The augmented data 117 may specify the features 113 to which the augmented data 117 is relevant. Thus, the processor 110 may locate the features 113 in the image data 107 and overlay the augmented data 117 at a particular location. As examples, the particular location may be proximate to the relevant feature 113, be overlapping with the relevant feature 113, be associated with the relevant feature 113 (e.g., with an arrow, point, pin, highlight, or other indicator to the feature 113), be in a popup box or window, and/or the like.

The image data 107 with the overlaid augmented data 117 may together form an augmented image 118 that is transmitted to the display 120. The display 120 may display the augmented image 118 on the mobile device 100. In some embodiments, the display 120 may allow interaction with the augmented image 118, such as zooming in, zooming out, cropping, selecting a link (e.g., to a website or file), modifying, editing, and/or the like. This interaction may be facilitated by an input element (not shown) that provides input commands to the processor 110, such as a touchscreen element incorporated into the display, a mouse, a trackpad, a trackball, a keyboard, a microphone, and/or the like.

II. MAP APPLICATIONS

A map application may be implemented on a mobile device to assist a user in finding a location. The map application may display a map of the user's current location or an input location. The user may enter an address, drop a pin, and/or search for another location in the map application. The map application may display the location and, in some embodiments, allow manipulation of the view of the map displaying the location. For example, the map application may allow the user to zoom in, zoom out, rotate, display labels, hide labels, etc. The map application may further allow the user to perform one or more functions relative to the displayed location, such as to calculate and display directions from the user's current location to the displayed location, display traffic, change from a two dimensional to a three dimensional view and vice versa, change from a map view to a satellite view and vice versa, etc.

Map applications may implement graphical user interfaces, such as those depicting a two dimensional map view in a map application. An address may be entered into the map application (e.g., "2 Embarcadero Center, San Francisco, Calif."). The map application may retrieve and display map data including the entered address. In some examples, the map application may display the map data in a two dimensional map view. The map application may further drop a pin or other indicator at the entered address. The map data may include roads, road names, cities, city names, neighborhoods, landmarks, parks, businesses, public transportation, and/or the like.

In some examples, the graphical user interface may be zoomed in to show a closer view of the entered address. The zoomed in view may provide more detailed map data, such as more road names and more features (e.g., businesses and landmarks), with respect to what is shown in the original map view. To zoom in, a user may use his fingertips to manipulate the original map. For example, the user may place two fingertips on the original map, then spread his fingertips apart in order to zoom in and arrive at a more detailed map. This motion may not be intuitive for some users.

III. MOVEMENT INTERFACE FOR INTERACTING WITH MAP

Figure 2A:
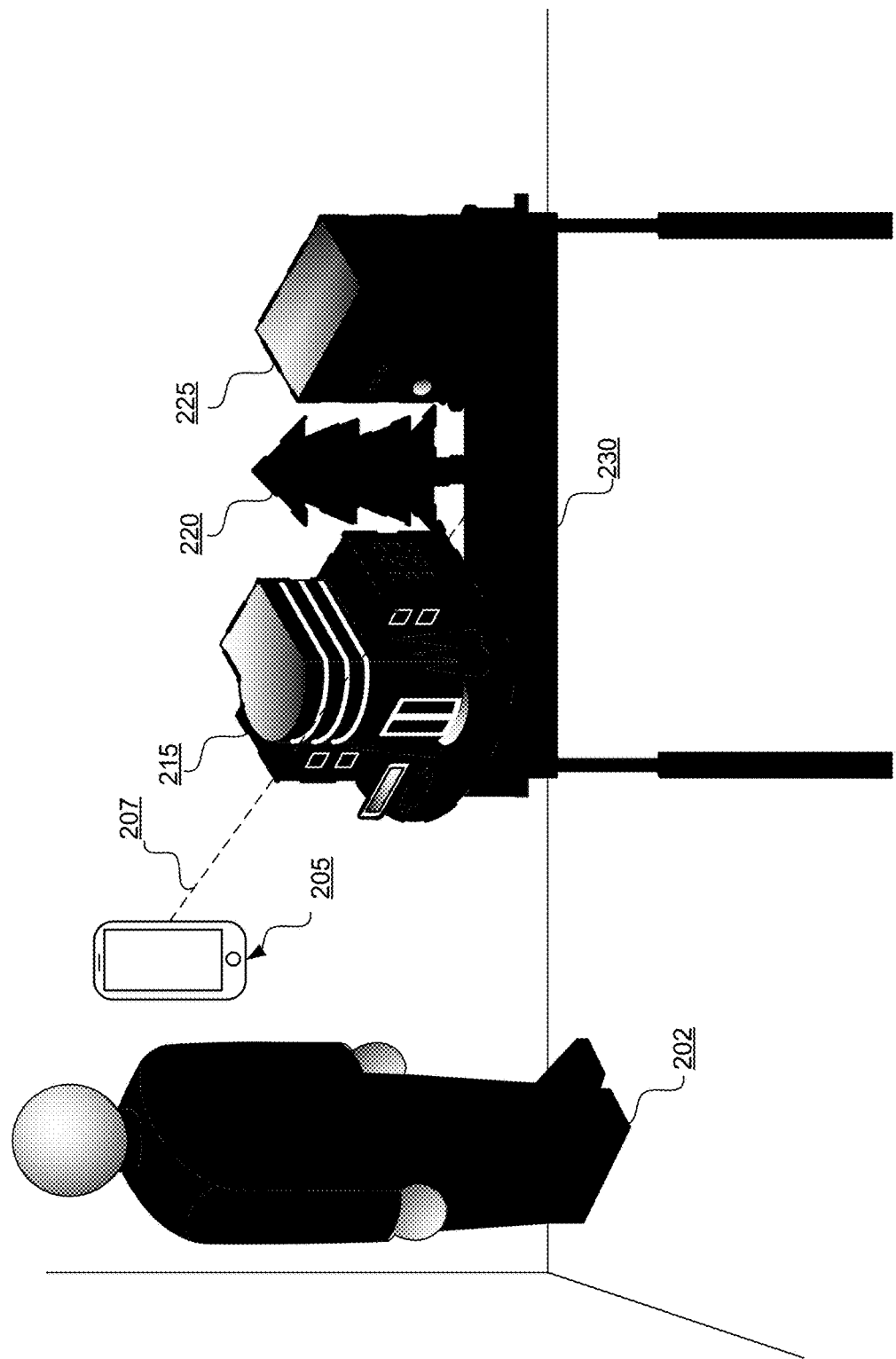
FIG. 2A shows a diagram depicting a user using a mobile device to register and view an augmented reality virtual map as if a three-dimensional map existed in a room according to some embodiments of the present invention.

Some embodiments of the present invention provide a virtual reality interface or augmented reality interface in which the map is the virtual environment and the movement of the mobile device is the user's real world interaction with the virtual environment. For example, embodiments provide a movement-controlled user interface that allows for intuitive interaction with a displayed map, without requiring fingertip manipulation on the display. The interaction may be made by physically moving (e.g., through translation and/or rotation of) the mobile device upon which the map is displayed. For example, the map may be zoomed in when the mobile device is moved away from the user (e.g., toward an object in view), and zoomed out when the mobile device is moved toward the user (e.g., away from an object in view). Similarly, the map may be shifted left when the mobile device is moved leftward, up when the mobile device is rotated upward, and the like. Display of virtual map based on movement of mobile device In some embodiments, an interface may be provided in which a virtual map image may be displayed on a mobile device, and in some embodiments, overlaid onto a real world image. FIG. 2A shows a diagram depicting a user 202 using a mobile device to view a virtual map according to some embodiments of the present invention. Specifically, the user 202 may use a physical camera of the mobile device at initial position 205 to capture an image of the desk 230. The mobile device may identify desk 230 as a suitable surface (e.g., a horizontal surface or flat surface) on which to overlay a map image including three dimensional map objects (e.g., building 215, tree 220, and bank 225). Thus, the mobile device may display the three dimensional map objects onto the desk 230 as seen on the display of the mobile device. Building 215, tree 220, and bank 225 may appear to be positioned on the desk 230 such that the base of the objects appear to be positioned on the desk 230 with the objects protruding from the desk 230.

The dashed lines in FIG. 2A indicate that these map objects are only seen by a user when viewing a display of the mobile device, and that these map objects are not physically present on the desk 230. In FIG. 2A, the building 215 may appear to be closest to the user 202, followed by the tree 220 and the bank 225, e.g., when the user 202 is viewing the display of the mobile device as a camera of the mobile device is pointed at the desk 230. Although shown and described herein with respect to a desk 230, it is contemplated that building 215, tree 220, and bank 225 may be rendered onto any arbitrary horizontal plane. Further, it is contemplated that the rendering of building 215, tree 220, and bank 225 may be not be limited to a set region (e.g., the bounds of desk 230), but may rather render to the user 202 as if the image goes to the horizon.

The physical camera may have a viewpoint represented by a registration vector 207 at which the tree 220 is at a default origin position. The default origin position may be, for example, the central point in the physical camera's initial field of view. The origin position may reflect the initial view of the physical camera, with the location of the map objects defined with respect to that origin position. For example, the building 215 may be defined at a position three inches to the left and one inch ahead of the origin position, the tree 220 may be defined at the origin position, and the bank 225 may be defined at a location two inches to the right and one inch behind the origin position. These positions may be scaled down or translated from real world distances. For example, the building 215 may be 100 feet from the origin position, but be scaled down to three inches for purposes of position on desk 230. These locations with respect to the origin position may be used to register the positions of the map objects relative to any movement of the mobile device at initial position 205.

The mobile device may then be moved around the desk 230, still pointed at the desk 230, and the map image may be continuously rendered to reflect the changes in position and orientation, such that the map image appears to be an interactive three-dimensional model on the desk 230. Such movement of the mobile device can control a virtual position of a virtual camera that is used to render the images of the virtual three-dimensional model. The three-dimensional model may be moved, repositioned, zoomed, and otherwise interacted with by a user via movement of the mobile device implementing the augmented reality interface.

Figure 2B:
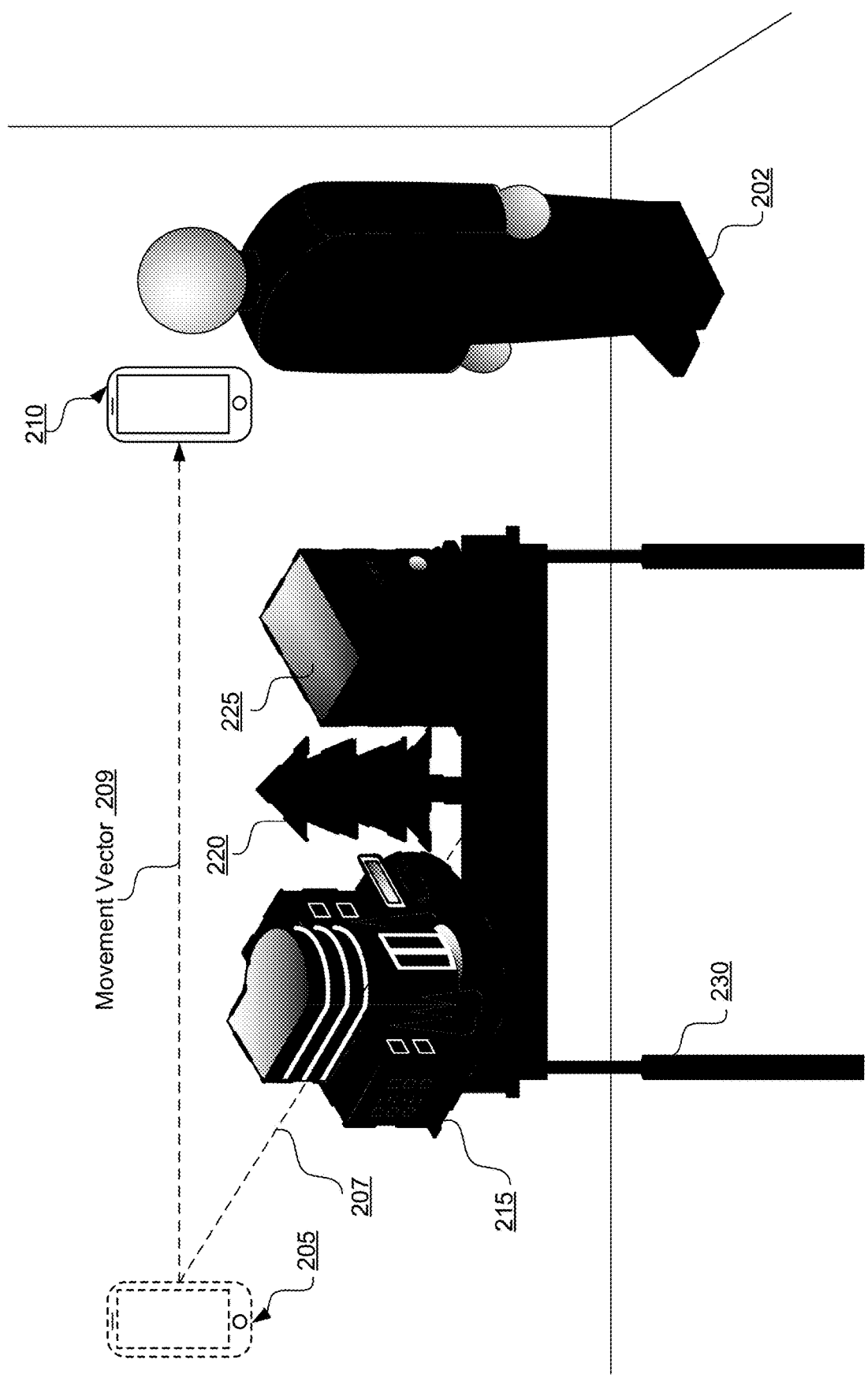
FIG. 2B shows a diagram depicting a user using a movement-controlled user interface of the augmented reality virtual map to view the three-dimensional map from a different perspective with respect to FIG. 2A according to some embodiments of the invention.

FIG. 2B shows a diagram depicting the user 202 using the mobile device to view an augmented reality virtual map from a current position 210 with respect to FIG. 2A according to some embodiments of the invention. In FIG. 2B, the user 202 has moved the mobile device from initial position 205 to current position 210. This change in position from position 205 to position 210 may be represented by a movement vector 209 that shows the movement of the mobile device from the left side of the desk 230 to the right side of the desk 230. The movement vector 209 may define movement of the mobile device relative to its initial position 205. The current position 210 of the mobile device may be defined by its initial position 205 relative to the origin position and the movement vector 209. In some embodiments, the movement vector 209 may be scaled to the map image to reflect the movement with respect to the three-dimensional map objects (e.g., building 215, tree 220, and bank 225). In other words, the movement vector 209 may be scaled to a different amount of movement of the map objects. For example, every inch of movement of the physical camera may be scaled to five feet of movement of the virtual camera used to view the map objects. After moving to the current position to the right of the desk 230, the bank 225 may appear closest to the user 202, followed by the tree 220 and the building 215.

Figure 2C:
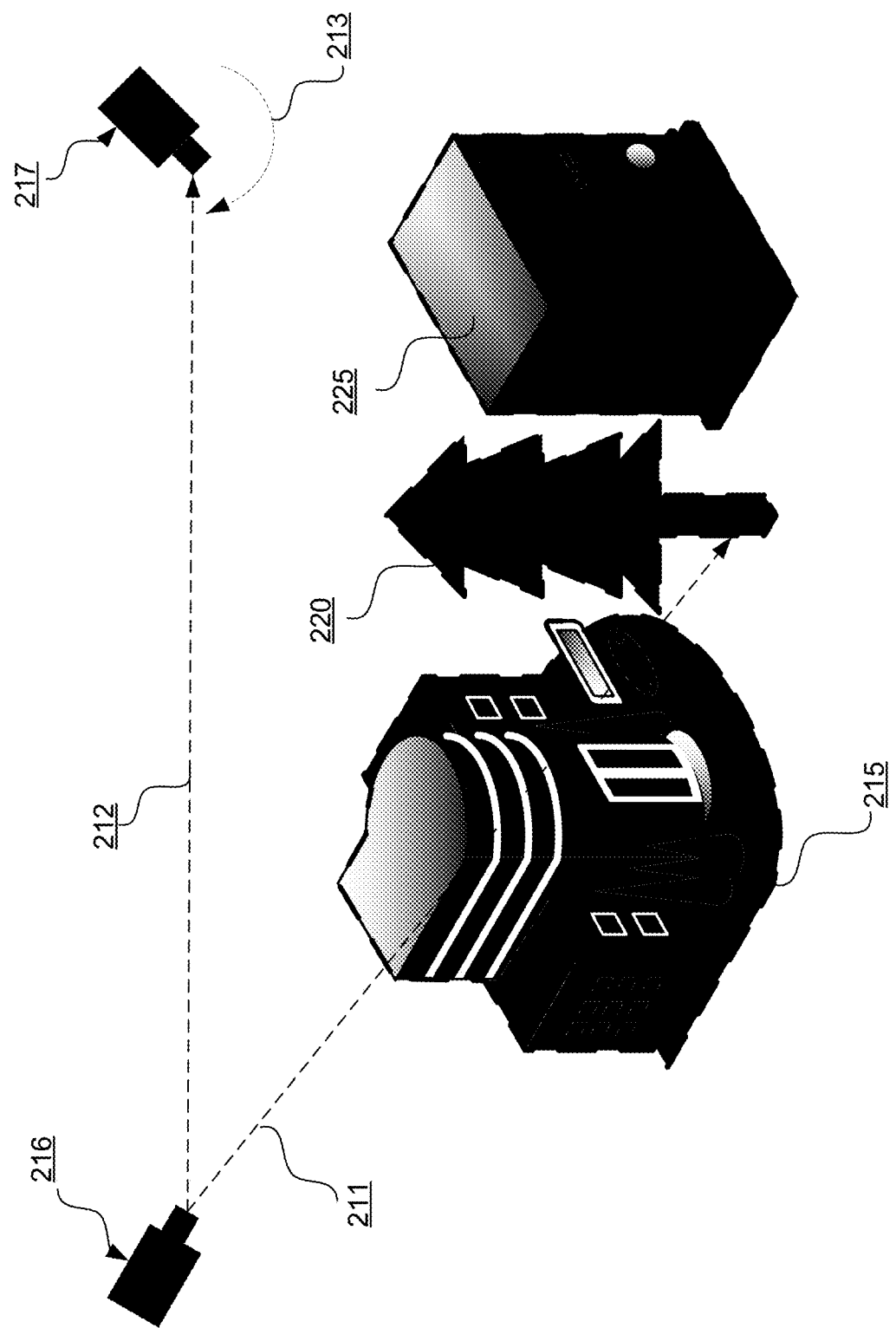
FIG. 2C shows a movement of a virtual camera to view a virtual map as controlled by movement of a mobile device according to some embodiments of the present invention.

FIG. 2C shows movement of a virtual camera to view an augmented reality virtual map as controlled by movement of a mobile device according to embodiments of the present invention. As stated above, the mobile device may have a physical camera that may capture images of the real world. The mobile device may be associated with a virtual camera at an initial position 216 in the virtual map environment, the perspective of which is used to display the map objects (e.g., building 215, tree 220, and bank 225). The origin position and registration vector 207 defined by the physical camera may correspond to an origin position and registration vector 211 defined by the virtual camera. The origin position defined by the virtual camera may be a position in the virtual map around which the positions of map objects are registered. The registration vector 211 may define the initial position 216 and perspective of the virtual camera with respect to the origin position.

When the mobile device is moved and rotated around the desk 230, as shown in FIG. 2B, the map image may be continuously rendered to reflect the changes in position and orientation. For example, the mobile device may be moved from an initial position 205 and orientation to a current position 210 and orientation. Correspondingly, the virtual camera may be moved from initial position 216 and orientation to current position 217 and orientation. Orientation vector 213 may illustrate the rotation of the virtual camera in association with a rotation of the mobile device from an initial position 205 to a current position 210, which may be defined as a 6-dimensional vector of 3 translation coordinates and 3 rotation angles. The map objects (e.g., building 215, tree 220, and bank 225) may then be rendered from the perspective of the virtual camera at current position 217, at its current orientation. Thus, the virtual camera at the initial position 216 may view an image of the backside of building 215, tree 220, and bank 225 from nearest to farthest (e.g., corresponding to position of the mobile device 205 in FIG. 2A), while the virtual camera at the current position 217 may view an image of the front side of bank 225, tree 220, and building 215 from nearest to farthest (e.g., corresponding to position of the mobile device 205 in FIG. 2B). A height of the mobile device or a distance between the mobile device and the desk 230 can also control the height of the virtual camera.

FIGS. 2A-C describe the rendering of the virtual building 215, tree 220, and bank 225 onto the camera-captured image of the real world desk 230. However, it is contemplated that, in some embodiments, the images captured by the camera of the mobile device 205 are not displayed on the mobile device 205. In other words, the virtual map including the virtual building 215, tree 220, and bank 225 may not be overlaid onto a real world image (e.g., onto real world desk 230), and may be displayed without the real world image.

A. Map Interface

Figure 3:
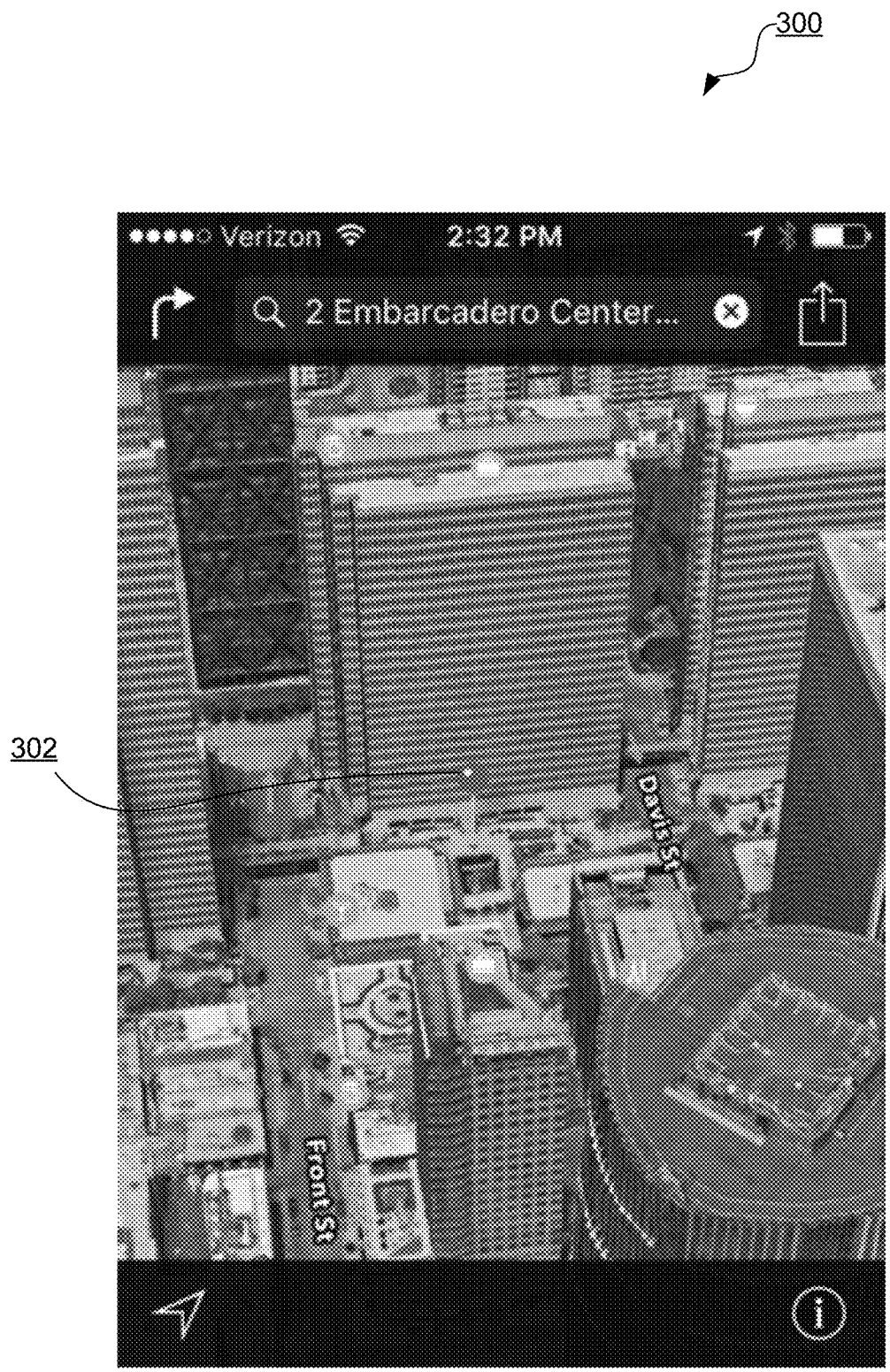
FIG. 3 shows a display depicting a zoomed in, three dimensional satellite view from the perspective of a virtual camera in a map application according to some embodiments of the present invention.

The initial three dimensional view of a map from the perspective of the virtual camera may be displayed in response to a location being detected or an address being entered. FIG. 3 shows a graphical user interface depicting a zoomed out, three dimensional satellite map view map image 300 from the perspective of a virtual camera (e.g., virtual camera at initial position 216) in a map application according to some embodiments of the present invention. As shown in FIG. 3, an address has been entered into the map application (e.g., "2 Embarcadero Center, San Francisco, Calif."). The map application may retrieve and display map data including the entered address.

In this example, the map application may display the map data in a three dimensional satellite (e.g., overhead) view. The map application may further drop a pin or other indicator at the entered address. The map data may include roads, road names, cities, city names, neighborhoods, landmarks, parks, businesses, public transportation, and/or the like (e.g., map objects such as building 215, tree 220, and bank 225 of FIGS. 2A-C). In some embodiments, the three dimensional satellite view of FIG. 3 may be displayed in response to a user selection of a three dimensional satellite view from the graphical user interface.

The map image 300 can correspond to the initial position of a virtual camera, e.g., initial position 216 of FIG. 2C. The physical camera can have a corresponding initial position from which movement is compared. Movement from this initial position of the mobile device as captured by the physical camera and/or sensors may result in corresponding movement in the displayed map.

Figure 4:
FIG. 4 shows a display depicting a zoomed in, shifted three dimensional satellite view from the perspective of a virtual camera in a map application according to some embodiments of the present invention.

FIG. 4 shows a graphical user interface depicting a zoomed in, three-dimensional satellite map image 400 from the perspective of a virtual camera (e.g., the virtual camera at position 217 of FIG. 2C) in a map application according to some embodiments of the present invention. The perspective of the virtual camera of FIG. 4 has been shifted with respect to FIG. 3. Specifically, the virtual camera of FIG. 4 has been zoomed in and shifted to the left. As an example, such movement can correspond to a user taking a step to the left and a step forward. In this manner, the user can control which map objects are displayed on a screen of the mobile device, as well as how they are displayed (e.g., what zoom level or what virtual camera angle is used) by moving the mobile device.

IV. COOPERATIVE MAP INTERFACE

In some embodiments, a user's mobile device (i.e., a host device) may identify its origin in a 3D map and a current virtual camera position relative to the origin based on the physical position of the mobile device. The mobile device may send both the origin and the virtual camera position to a second mobile device (i.e., a client device) for use in rendering a corresponding image. Separately, the client device may download the 3D map images from a server, e.g., in preparation for a meeting. In this manner, the host device may send the origin to the client device once, as well as send a data stream of the current virtual camera position for use in accessing the corresponding 3D map images at the client device. In some implementations, the mobile device can send the origin and virtual camera position to a server, and the server can send the origin and virtual camera position to the second mobile device. The second mobile device can receive a stream of the virtual camera positions.

A. Follower Mode

A user's movement interactions with the map interface (e.g., movement of the mobile device causing movement of the displayed map) may be shared amongst one or more other mobile devices. For example, a first user can navigate or interact with a map image and share the experience with a second user. This allows the second user to see the same map objects as the first user and have the same experience. In some implementations, a sending mobile device (i.e., a host device) may transmit an origin position in a region of a map to one or more receiving mobile devices (i.e., a client device). This origin position may be sent initially to a client device or after the client device downloads a set of map images corresponding to an initial geographic indicator. The origin position may correspond to, for example, the current position of the host device with respect to the virtual world, an address entered by the host device, coordinates entered by the host device, a point of interest entered by the host device, a pin dropped by the host device, etc. In another example, the origin position may be a default position based on the position of the host device as captured by a physical camera with respect to a map image. For example, as shown in FIG. 3, the origin position 302 may correspond to "2 Embarcadero Center".

In response to receiving the origin position 302, the client device may download a set of map objects corresponding to the region of the map including the origin position. In some embodiments, the client device may include a rendering engine that uses the map objects and the origin position to generate the map images. In some embodiments, the client device may download these map objects from a map server or other server computer, thereby reducing bandwidth needed between the host device and client device. In some embodiments, however, the client device may download some or all of these map objects from the host device. For example, the client device may download the map image 300 shown in FIG. 3, as well as other map images surrounding the origin position 302. For example, the client device may download map images within a certain radius of the origin position 302, e.g., map images and objects within a mile of the origin position 302. Thus, the client device may have the most likely map objects needed for display available locally.

The host device may transmit a stream of virtual positions of the host device in the map corresponding to physical movements of the host device. For example, as shown in FIGS. 3 and 4 and described above, the host device may physically move forward and to the left, causing manipulation of the displayed map 400 as shown in FIG. 4. Specifically, the map may zoom in and pan left with respect to the origin position 302, causing a stream of virtual positions indicated by trace 304. The current virtual position of the host device may be indicated by an indicator 306.

In response to receiving the stream of virtual positions of the host device, the client device may render and display a series of map images using the stream of virtual positions. For example, the client device may render and display the zooming in and movement to the left of the map image shown in FIG. 3 along the trace 304 as a series of map images. The movement may stop at the current virtual position of the host device as indicated by the indicator 306. Thus, the map image 400 shown in FIG. 4 may be displayed on both the host device and the client device.

Figure 5A:
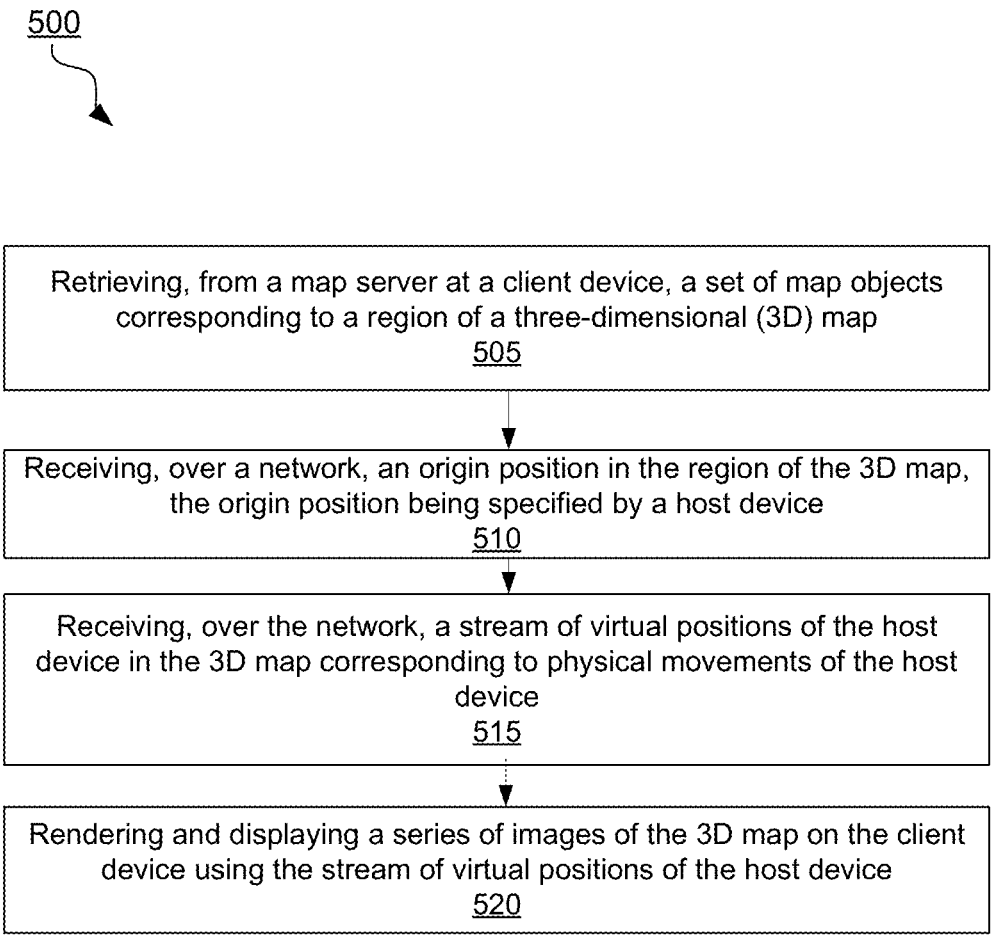
FIG. 5A shows a flow chart depicting a method for implementing a follower mode on a map interface of a mobile device according to some embodiments of the present invention.

FIG. 5A shows a flow chart 500 depicting a method for implementing a follower mode on a map interface of a mobile device according to some embodiments of the present invention. At step 505, a client device may retrieve a set of map objects corresponding to a region of a map. In some embodiments, the map may be a three-dimensional (3D) map. In some embodiments, the client device may retrieve the set of map objects from a map server or other remote server computer, freeing up bandwidth between the client device and a host device. In some embodiments, the client device may retrieve the set of map objects from a host device. Although referred to herein as "a" host device and "a" client device, it is contemplated that one or more host device and one or more client device may be used in similar embodiments.

At step 510, the client device may receive an origin position in the region of the map over a network. The network may be any type of local or remote communication network, such as, for example, WiFi, Bluetooth, near field communication (NFC), a cellular network, a virtual private network (VPN), the Internet, or any other suitable network. The origin position may be specified by the host device. For example, the host device may select its current position, may enter an address, may enter coordinates, may enter a point of interest, may select a location from a map image, e.g., by dropping a pin on the map image, etc. In some embodiments, step 510 may be performed prior to step 505, such that the client device downloads the set of map objects most relevant to and/or proximate to the origin position.

At step 515, the client device may receive, over a network, a stream of virtual positions of the host device in the map. The network may be the same or a different network. For example, the client device may receive the origin position of the host device via Bluetooth, but receive the stream of virtual positions over WiFi due to decreased or diminished Bluetooth signal strength. The stream of virtual positions in the map may correspond to physical movements of the host device in the real world. For example, physically moving the host device to the right may generate a stream of virtual positions in the map moving down the street to the right of the origin position. The stream of virtual positions may together make up a "trace" indicating the virtual movement of the host device in the map.

At step 520, the client device may render and display a series of images of the map using the stream of virtual positions of the host device. The client device may use the stream of virtual positions to determine which map objects to retrieve from memory and display. For example, if the stream of virtual positions in the map indicates that the center of the map should be moved from the origin position down the street to the right of the origin position by 500 feet, map objects along that trace may be retrieved, rendered, and displayed on the client device. Thus, the client device may "follow" the movement of a host device within a map based on physical movements of the host device.

Figure 5B:
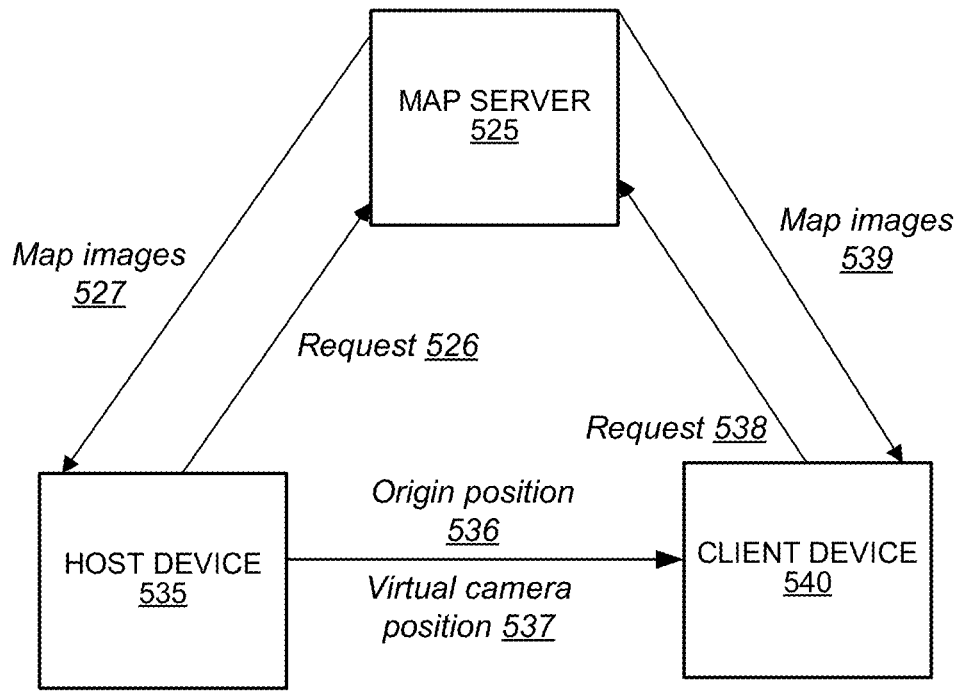
FIG. 5B shows a block diagram depicting a host device and a client device implementing cooperative map interfaces according to some embodiments of the present invention.

FIG. 5B shows a block diagram depicting a host device 535 and a client device 540 implementing cooperative map interfaces according to some embodiments of the present invention. As shown in FIG. 5B, the host device 535 may transmit a request 526 to a map server 525 for map images. The request may include a geographic indicator of the desired map images, such as, for example, an origin position, an address, a set of coordinates, a pin, etc. In response to the request 526, the host device 535 may download map images 527 from the map server 525. The map server 525 may be any server computer and/or database storing map images. In some embodiments, the map images 527 received from the map server 525 may be selected based on, for example, proximity to the origin position 536 entered by the host device 535. The origin position 536 may be selected, for example, based on the current position of the host device 535, an address or coordinates entered by the host device 535, a pin dropped on a map displayed on the host device 535, etc. The map images 527 may be displayed on the host device, and in some embodiments, centered on the origin position 536.

The host device 535 may transmit the origin position 536 to the client device 540. Based on the origin position 536 and/or a geographic indicator, the client device 540 may download the map images 539 from the map server 525. Because the map images 539 may be downloaded from the map server 525 instead of the host device 535, bandwidth may be preserved between the host device 535 and the client device 540. The map images 539 may be displayed on the client device, and in some embodiments, centered on the origin position 536.

The host device 535 may be physically moved and/or manipulated in order to cause movement and/or manipulation of the displayed map images. In other words, the positions 537 of a virtual camera of the host device virtually pointed at the map images may be moved and/or manipulated based on the physical movement of the host device 535. These virtual camera positions 537 may be transmitted to the client device 540. The client device 540 may then transmit a request 538 to the map server 525 for map images 539 in proximity of the geographic indicator. The client device 540 may then render and display the same movements of the map images using the virtual camera positions 537 of the host device 535.

In some embodiments, the client device 540 may also enter a "discovery mode" in which the client device 540 may control the map images 539 displayed on the client device 540, independent of the map images 527 displayed on the host device 535. In these embodiments, the physical camera of the client device 540 may be used to capture initial and subsequent images of the real world (or other sensors may be used to capture movement of the client device, such as an accelerometer). Corresponding movement of the map images 539 may be made based on the physical movement of the client device 540. Thus, in "discovery mode", the map images 539 displayed on the client device 540 may be different than the map images 527 displayed on the host device 535, as the client device 540 is in control of its own displayed map images 539.

FIG. 6A shows a diagram depicting a client device 607 and a host device 605 being used to view an augmented reality map as if a three-dimensional map existed in a room according to some embodiments of the present invention. In some embodiments, an interface may be provided in which a virtual map image may be displayed on a mobile device, and in some embodiments, overlaid onto a real world image by the host device and/or the client device. Specifically, a user may use a physical camera of the host device at initial position 205 to capture an image of the desk 630. The host device may identify desk 630 as a suitable surface (e.g., a horizontal surface or flat surface) on which to overlay a map image including three dimensional map objects (e.g., building 615, tree 620, and bank 625). Thus, the host device may display the three dimensional map objects onto the desk 630 as seen on the display of the host device. Building 615, tree 620, and bank 625 may appear to be positioned on the desk 630 such that the base of the objects appear to be positioned on the desk 630 with the objects protruding from the desk 230.

The dashed lines in FIG. 6A indicate that these map objects are only seen by a user when viewing a display of the host device, and that these map objects are not physically present on the desk 630. Although shown and described herein with respect to a desk 630, it is contemplated that building 615, tree 620, and bank 625 may be rendered onto any arbitrary horizontal plane. Further, it is contemplated that the rendering of building 615, tree 620, and bank 625 may be not be limited to a set region (e.g., the bounds of desk 630), but may rather render to the user as if the image goes to the horizon.

The host device may then be moved around the desk 630, still pointed at the desk 630, and the map image may be continuously rendered to reflect the changes in position and orientation, such that the map image appears to be an interactive three-dimensional model on the desk 630. Such movement of the mobile device can control a virtual position of a virtual camera that is used to render the images of the virtual three-dimensional model. The three-dimensional model may be moved, repositioned, zoomed, and otherwise interacted with by a user via movement of the mobile device implementing the augmented reality interface. The three-dimensional model may then be displayed as seen by the host device onto the client device at position 607. Although shown as being in the same room, it is contemplated that the client device and the host device may be in the same or separate rooms, or may render the map image on the same or different surfaces.

Figure 6B:
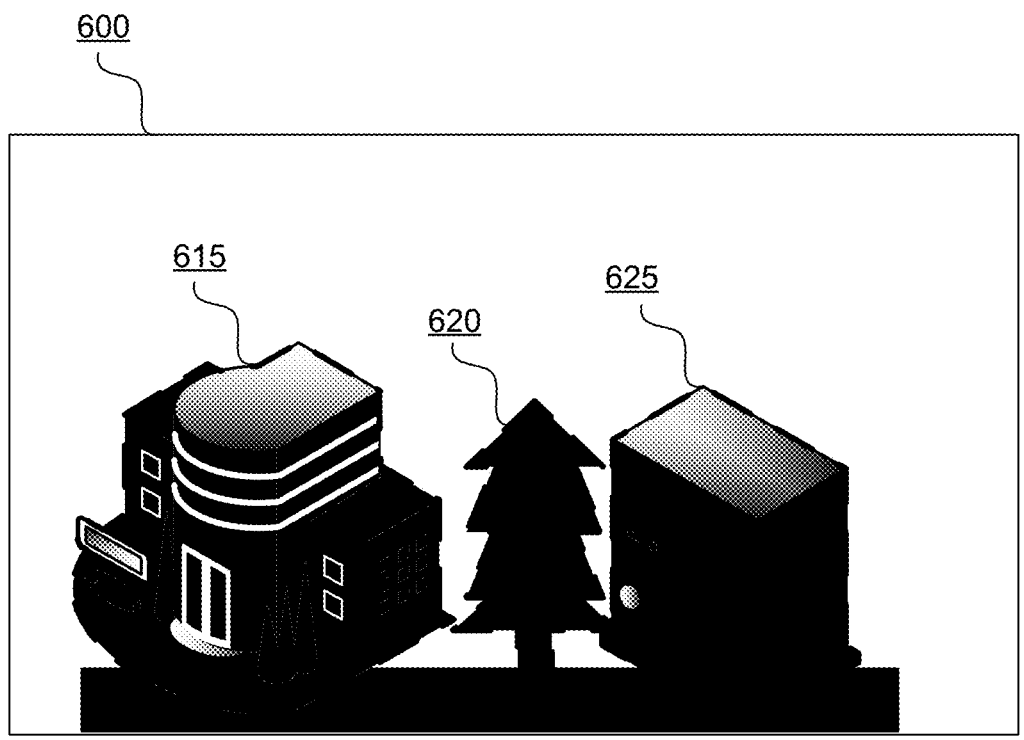
FIG. 6B shows a screen shot of a map image on a client device and a host device from the positions shown in FIG. 6A in a follower mode according to some embodiments of the present invention.

FIG. 6B shows a screen shot 600 of a map image on a client device and a host device from the positions shown in FIG. 6A in a follower mode according to some embodiments of the present invention. Specifically, host device at position 605 may view the map image as shown in FIG. 6B. The same map image may be displayed on the client device at position 607 when the client device is in a follower mode at position 607.

B. Discovery Mode

In some embodiments, the client device may also have an option to control its own view of the map images. For example, the user of the host device and the user of the client device can explore the map image independently. In such an option, the client device can display an icon, a marker, or other user interface object that indicates the current virtual camera position of the host device in the map. In some implementations, the icon corresponding to the host device can include an orientation indicator (e.g., a cone) that corresponds to the first of view of the virtual camera. In this manner, the client device may view what its user wants to see, while still being aware of what the user of the host device is seeing. In addition, the view of the client device may be able to be aligned with the view of the host device based on the displayed location of the host device. This mode may be referred to as a "discovery mode".

Figure 7:
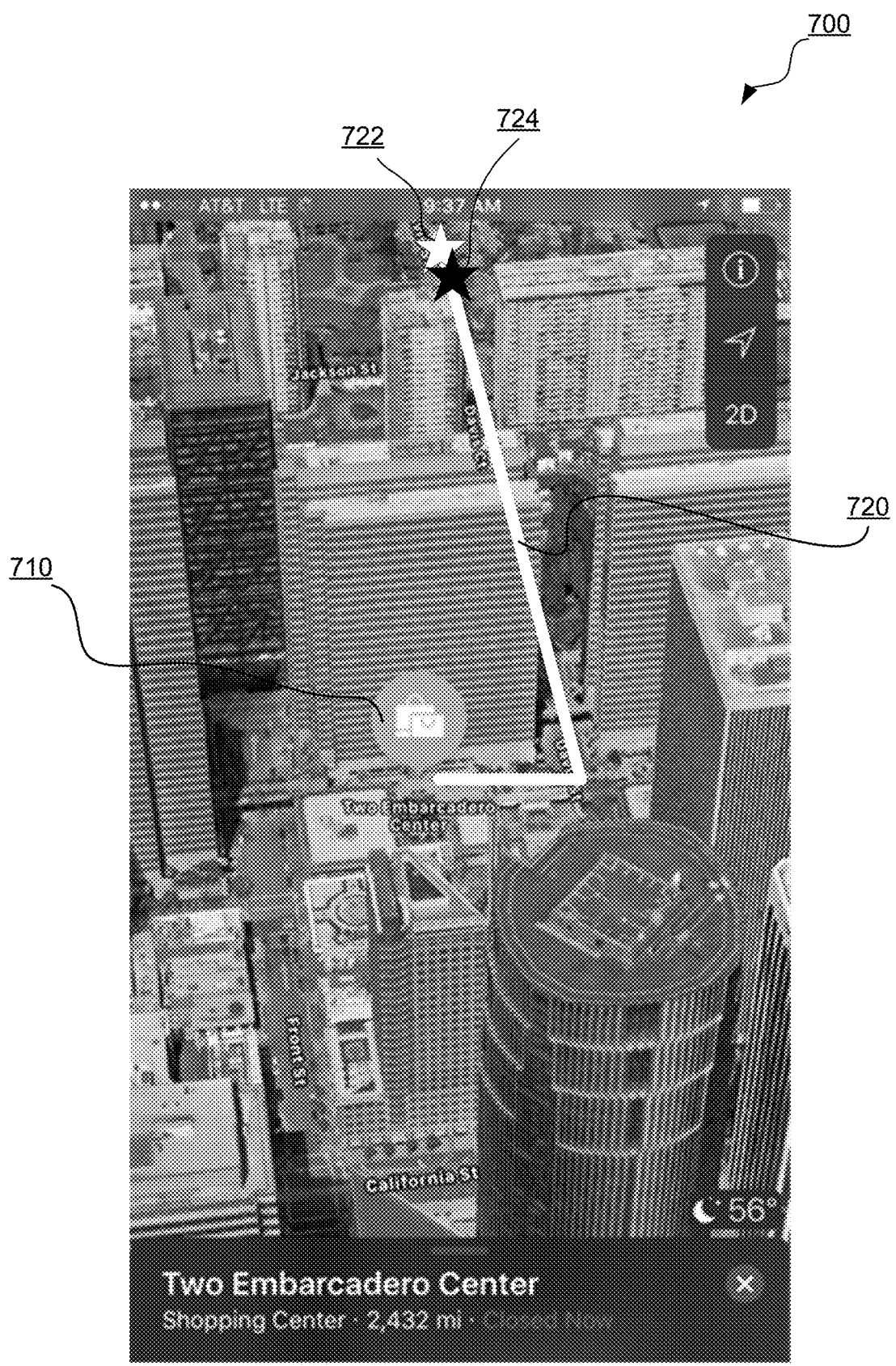
FIG. 7 shows a display depicting movement of a virtual camera of a host device through a three dimensional satellite view with a client device following the movement of the host device according to some embodiments of the present invention.

FIG. 7 shows a display depicting movement of a virtual camera of a host device through a three dimensional satellite view map image 700 with a client device following the movement of the host device according to some embodiments of the present invention. As described above, the host device may transmit an origin position 710 to the client device. In response to receiving the origin position 710, the client device may download a set of map objects corresponding to the region of the map including the origin position or based on other geographical data, such as a geographical indicator such as an address or pin.

The host device may transmit a stream of virtual positions of the host device in the map corresponding to physical movements of the host device. For example, as shown in FIG. 7, the host device may physically move right and forward, causing manipulation of the displayed map. Specifically, the map may shift right and forward with respect to the origin position 710, causing a stream of virtual positions indicated by trace 720. The current virtual position of the host device may be indicated by a host indicator 722. In some embodiments, the trace 720 may be created when the host device has finished moving, and the client device has retrieved the trace 720 at a later time. In some embodiments, the trace 720 may be created in real time, and the client device may see the trace 720 as it is being created.

In response to receiving the stream of virtual positions of the host device, the client device may render and display a series of map images using the stream of virtual positions. For example, the client device may render and display the movement right and forward along the trace 720 as a series of map images. The movement may stop at the current virtual position of the host device as indicated by the client indicator 724. Thus, the map image 700 shown in FIG. 7 may be displayed on both the host device and the client device. As shown in FIG. 7, although the client device may be able to freely move about the map image 700, the client device may continue to track the host device along the trace 720. For example, the host device may be acting as a tour guide and the client device may be following the tour of the host device.

Figure 8:
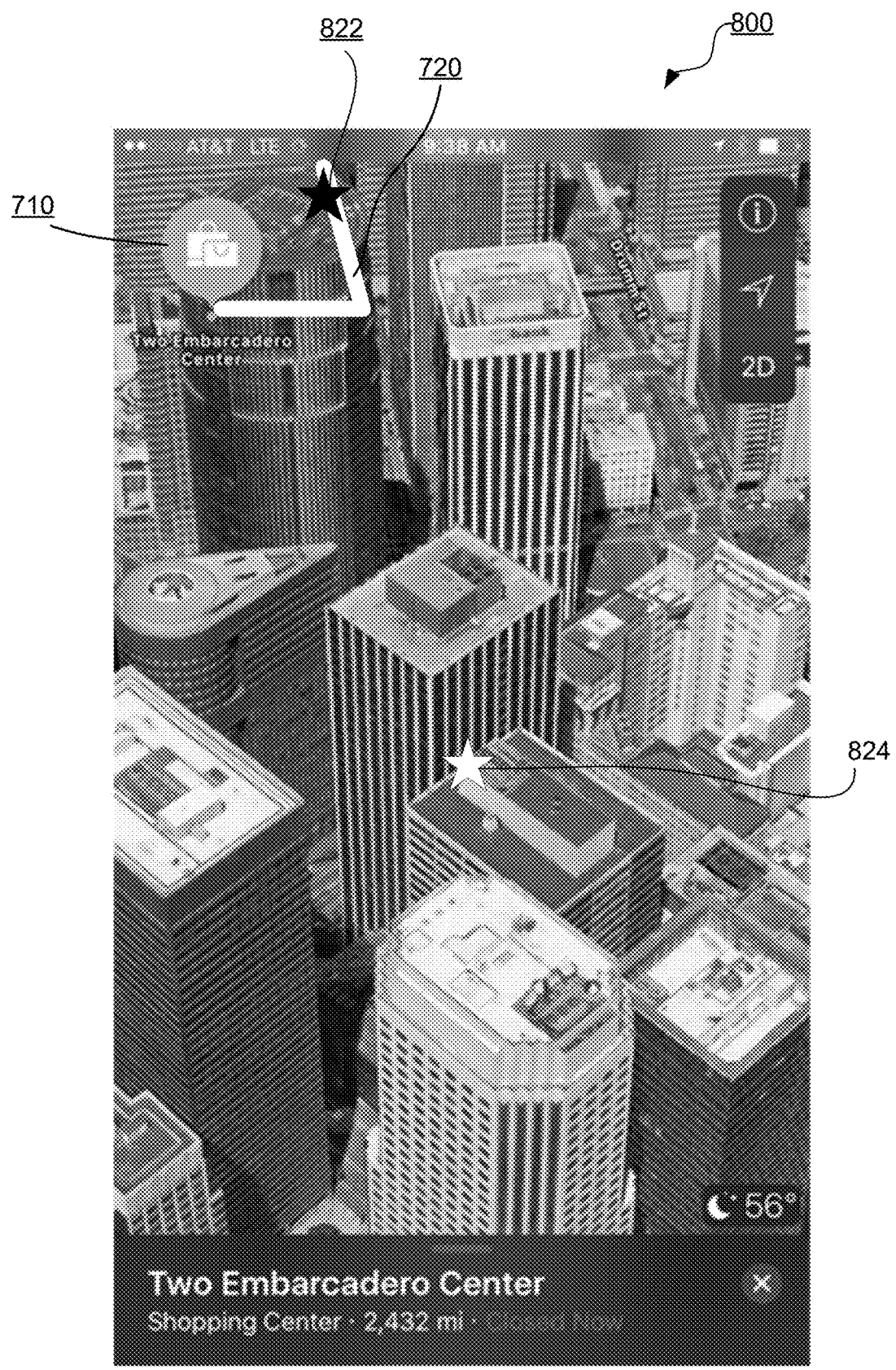
FIG. 8 shows a display depicting movement of a virtual camera of a host device through a three dimensional satellite view with a client device in a discovery mode according to some embodiments of the present invention.

In some embodiments, the client device may deviate from the trace 720 of the host device to view other map regions not followed by the host device. FIG. 8 shows a display depicting movement of a virtual camera of a host device through a three dimensional satellite view map image 800 with a client device in a discovery mode according to some embodiments of the present invention. As described above, the host device may transmit an origin position 710 to a client device. In response to receiving the origin position 710, the client device may download a set of map objects corresponding to the region of the map including the origin position.

The host device may transmit a stream of virtual positions of the host device in the map corresponding to physical movements of the host device. For example, as shown in FIG. 8, the host device may physically move right and forward, causing manipulation of the displayed map. Specifically, the map may shift right and forward with respect to the origin position 710, causing a stream of virtual positions indicated by trace 720. The current virtual position of the host device may be indicated by a host indicator 822.

In response to receiving the stream of virtual positions of the host device, the client device may render and display a series of map images using the stream of virtual positions. For example, the client device may render and display the movement right and forward along the trace 720 as a series of map images. However, in this embodiment, the client device may also render and display a series of map images using virtual positions of the client device. For example, the client device may begin to follow the trace 720, then activate a sensor of the client device to begin to capture physical movements of the client device. As shown in FIG. 8, for example, the client device may be physically moved to the right and downward in the real world, causing shifting of the map image 800 to the right and downward and away from the trace 720, as indicated by the client indicator 824. However, it is contemplated that the client device may deactivate the sensor and/or deselect a discovery mode in order to return the client device to the trace 720 at any time.

Figure 9:
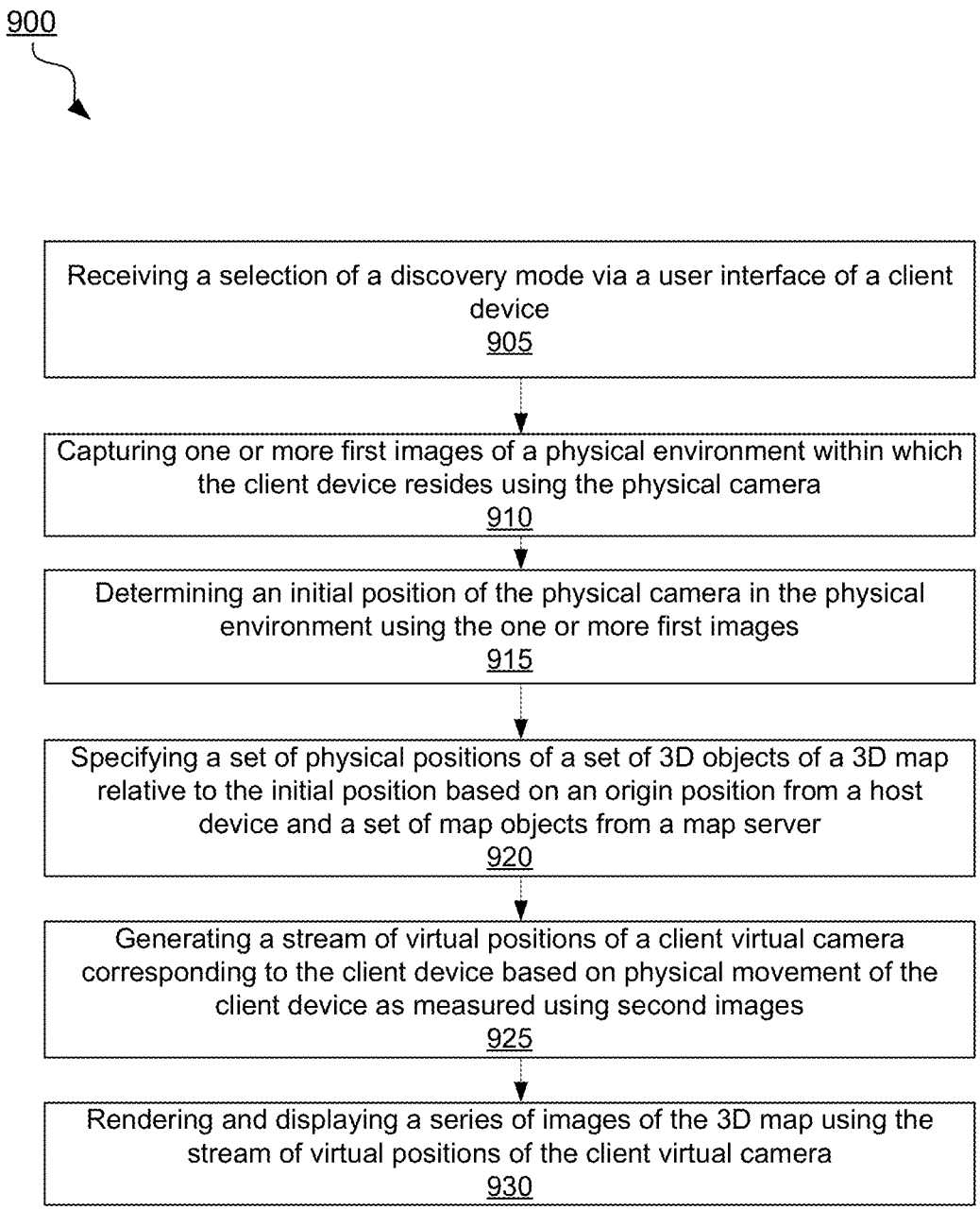
FIG. 9 shows a flow chart depicting a method for implementing a discovery mode on a map interface of a mobile device according to some embodiments of the present invention.

FIG. 9 shows a flow chart 900 depicting a method for implementing a cooperative discovery mode on a map interface of a mobile device according to some embodiments of the present invention. According to the method, a host device may begin at an origin position and move along a path of virtual positions in order to create a trace of the virtual path. A client device may receive this origin position and these virtual positions and follow the host device in a "follower mode", as described further herein.

At step 905, a selection of a discovery mode may be received via a user interface of a client device. The selection of the discovery mode may occur, for example, from a user input selection after map objects have been downloaded and an origin position has been obtained, as described further herein. The discovery mode may indicate, for example, that the client device does not want to follow the virtual positions of a host device, and instead wants to navigate map images independently. The selection of the discovery mode may be made, for example, by selecting an icon on a map image, by activating or selecting a camera on the client device, etc.

At step 910, one or more first images of a physical environment within which the client device resides may be captured using a physical camera of the client device. For example, the physical camera may capture an environment positioned in front of and around the physical camera. Further details regarding the capturing and interpreting of a physical environment around the physical camera are discussed further herein.

At step 915, an initial position of the physical camera in the physical environment may be determined using the one or more first images. The initial position of the physical camera can be defined relative to an origin position in the physical environment. In some embodiments, the origin position in the physical environment may correspond to the initial position of the physical camera when the selection of the discovery mode is made at step 905. Thus, the origin position in the physical environment can be taken as the initial position of the mobile device 205 in FIG. 2A. As another example, the origin position in the physical environment can be the center of the map objects (e.g., tree 220). As still another example, the origin position in the physical environment may be as defined by the host device.

At step 920, a set of physical positions of a set of 3D objects of a 3D map relative to the initial position may be specified based on an origin position from a host device and a set of map objects from a map server. The set of three-dimensional objects may correspond to the set of map objects. In some embodiments, the set of physical positions of the set of three-dimensional objects may be specified at default positions from the mobile device. The three-dimensional objects may include, for example, building 215, tree 220, and/or bank 225 of FIGS. 2A-2C. The determination of the physical positions of the 3D objects relative to the initial position of the physical camera can be defined with respect to the origin position of the host device, which may or may not be the initial position.

At step 925, a stream of virtual positions of a client virtual camera corresponding to the client device may be generated based on physical movement of the client device as measured using one or more second images of the physical environment. In other words, the physical movement of the client device may be determined by consecutive images taken by the physical camera of the client device. For example, a first image may be captured showing a room with a desk, a computer, and a bookshelf, where certain map objects (e.g., buildings, street names, etc.) can be displayed on a screen of the client device as if they were at about the location of the computer. The map objects can be displayed alone, or parts or all of a camera image of the physical world can also be displayed. A second, subsequent image may be captured showing only the computer (e.g., encompassing more pixels of the image), indicating that the user has walked toward the computer, and thus moved toward the map objects. The physical movement of the physical camera of the client device toward the computer may be translated into a virtual movement of the client virtual camera in the map application.

At step 930, a series of images of the 3D map may be rendered and displayed using the stream of virtual positions of the client virtual camera. In this case, the physical movement of the client device to be closer to the computer may be translated into a zoomed-in view of the three-dimensional map. Thus, movement of the client device can allow a user to control what parts of a map (e.g., a three-dimensional map) are displayed on the mobile device. This control of what is displayed on the client device may be independent of what is being displayed on the host device, in some embodiments.

Figure 10B:
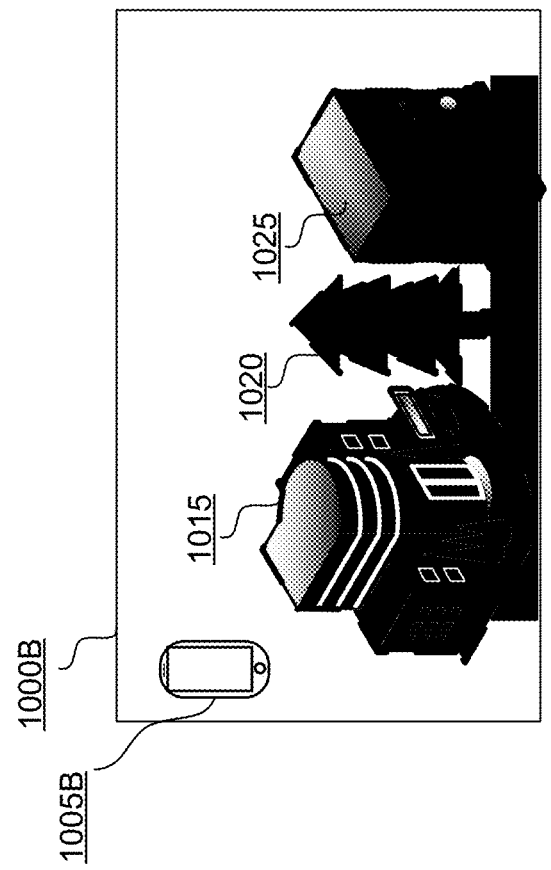
FIG. 10B shows a screen shot of a map image on a client device from the position shown in FIG. 6B in a discovery mode according to some embodiments of the present invention.
Figure 10A:
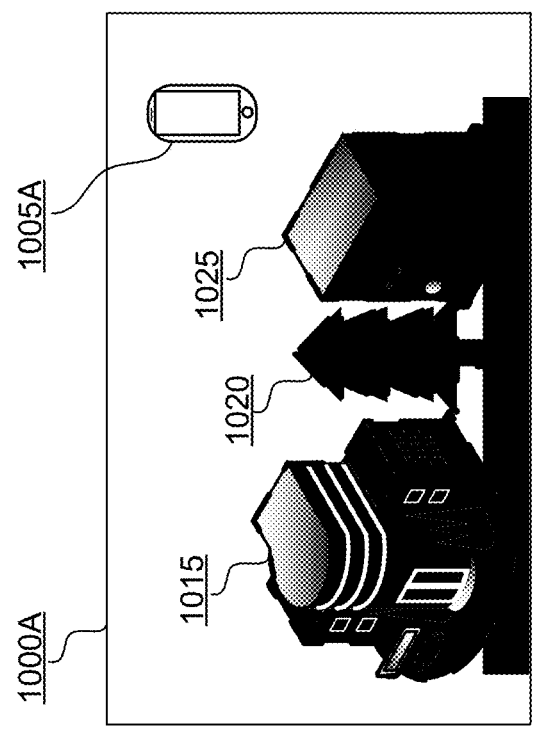
FIG. 10A shows a screen shot of a map image on a host device from the position shown in FIG. 6A in a discovery mode according to some embodiments of the present invention.

FIG. 10A shows a screen shot 1000A of a map image on a host device from the position 605 shown in FIG. 6A in a discovery mode according to some embodiments of the present invention. Specifically, host device at position 605 may view the map image as shown in FIG. 10A. As shown in FIG. 10A, the host device sees the building 1015 closest to the host device, followed by the tree 1020 and the bank 1025. In some embodiments, the virtual position of the host device in the screen shot 1000A may be displayed as an indicator 1005A in the map image.

FIG. 10B shows a screen shot 1000B of a map image on a client device from the position 607 shown in FIG. 6B in a discovery mode according to some embodiments of the present invention. Because the client device is in a discovery mode, the screen shot 1000B shows a map image from a different view point that is independent from the view point of the host device, as reflected in FIG. 10A. As shown in FIG. 10B, the client device sees the bank 1025 closest to the client device, followed by the tree 1020 and the building 1015. In some embodiments, the virtual position of the host device in the screen shot 1000B may be displayed as an indicator 1005B in the map image. In order for the client device to see the same map image from the same virtual position as the host device, user input corresponding to a selection of the indicator 1005B may be received. By selecting the indicator 1005B on the client device, the displayed map image may move to correspond to screen shot 1000A, such that the view on the client device is the same as the view on the host device. Thus, the client device may toggle between a discovery mode and a follower mode.

C. Combined Mode

Figure 11:
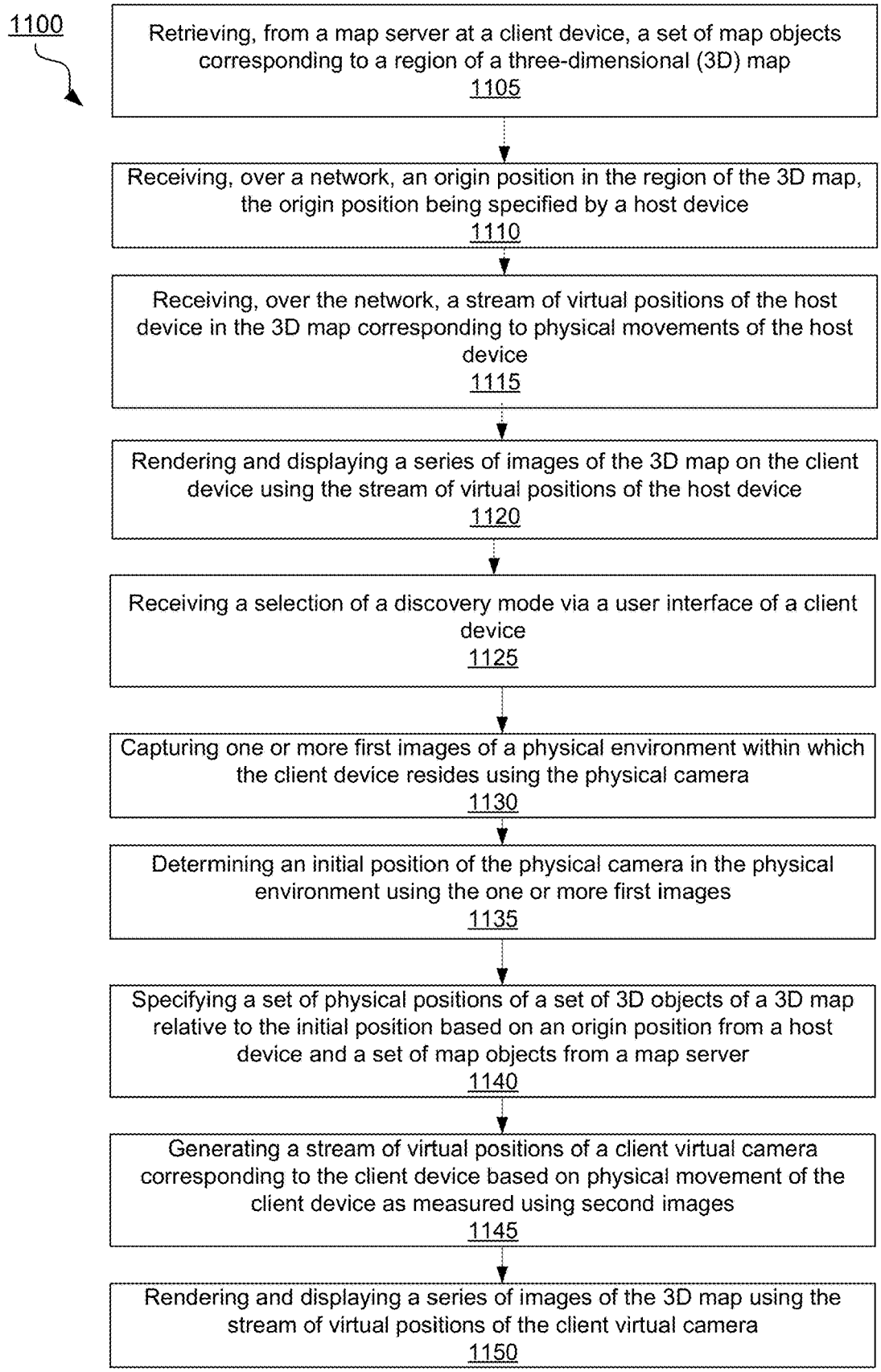
FIG. 11 shows a flow chart depicting a method for combined follower and discovery modes on a map interface of a mobile device according to some embodiments of the present invention.

In some embodiments, the client device may toggle between a "follower mode" and a "discovery mode". FIG. 11 shows a flow chart 1100 depicting a method for combined cooperative follower and discovery modes on a map interface of a mobile device according to some embodiments of the present invention.

At step 1105, a client device may retrieve a set of map objects corresponding to a region of a map. In some embodiments, the map may be a three-dimensional (3D) map. In some embodiments, the client device may retrieve the set of map objects from a map server or other remote server computer, freeing up bandwidth between the client device and a host device. In some embodiments, the client device may retrieve the set of map objects from a host device. Although referred to herein as "a" host device and "a" client device, it is contemplated that one or more host device and one or more client device may be used in similar embodiments.

At step 1110, the client device may receive an origin position in the region of the 3D map over a network. The network may be any type of local or remote communication network, such as, for example, WiFi, Bluetooth, near field communication (NFC), a cellular network, a virtual private network (VPN), or any other suitable network. The origin position may be specified by the host device. For example, the host device may select its current position, may enter an address, may enter coordinates, may enter a point of interest, may select a location from a map image, e.g., by dropping a pin on the map image, etc. In some embodiments, step 1110 may be performed prior to step 1105, such that the client device downloads the set of map objects most relevant to and/or proximate to the origin position.

At step 1115, the client device may receive, over a network, a stream of virtual positions of the host device in the map. The network may be the same or a different network. For example, the client device may receive the origin position of the host device via Bluetooth, but receive the stream of virtual positions over WiFi due to decreased or diminished Bluetooth signal strength. The stream of virtual positions in the map may correspond to physical movements of the host device in the real world. For example, physically moving the host device to the right may generate a stream of virtual positions in the map moving down the street to the right of the origin position. The stream of virtual positions may together make up a "trace" indicating the virtual movement of the host device in the map.

At step 1120, the client device may render and display a series of images of the map using the stream of virtual positions of the host device. The client device may use the stream of virtual positions to determine which map objects to retrieve from memory and display. For example, if the stream of virtual positions in the map indicate that the center of the map should be moved from the origin position down the street to the right of the origin position by 500 feet, map objects along that trace may be retrieved, rendered, and displayed on the client device. Thus, the client device may "follow" the movement of a host device within a map based on physical movements of the host device.

At step 1125, a selection of a discovery mode may be received via a user interface of the client device. The discovery mode may indicate, for example, that the client device no longer wants to follow the virtual positions of the host device, and instead wants to navigate map images independently. The selection of the discovery mode may be made, for example, by selecting an icon on a map image, by activating or selecting a camera on the client device, etc.

At step 1130, one or more first images of a physical environment within which the client device resides may be captured using a physical camera of the client device. For example, the physical camera may capture an environment positioned in front of and around the physical camera.

At step 1135, an initial position of the physical camera in the physical environment may be determined using the one or more first images. The initial position of the physical camera can be defined relative to an origin position in the physical environment. In some embodiments, the origin position in the physical environment may correspond to the initial position of the physical camera when the selection of the discovery mode is made at step 1125. Thus, the origin position in the physical environment can be taken as the initial position of the mobile device 205 in FIG. 2A. As another example, the origin position in the physical environment can be the center of the map objects (e.g., tree 220). As still another example, the origin position in the physical environment may be as defined by the host device.

At step 1140, a set of physical positions of a set of 3D objects of a 3D map relative to the initial position may be specified based on an origin position from a host device and a set of map objects from a map server. The set of three-dimensional objects may correspond to the set of map objects. In some embodiments, the set of physical positions of the set of three-dimensional objects may be specified at default positions from the mobile device. The three-dimensional objects may include, for example, building 215, tree 220, and/or bank 225 of FIGS. 2A-2C. The determination of the physical positions of the 3D objects relative to the initial position of the physical camera can be defined with respect to the origin position of the host device, which may or may not be the initial position.

At step 1145, a stream of virtual positions of a client virtual camera corresponding to the client device may be generated based on physical movement of the client device as measured using one or more second images of the physical environment. In other words, the physical movement of the client device may be determined by consecutive images taken by the physical camera of the client device. For example, a first image may be captured showing a room with a desk, a computer, and a bookshelf, where certain map objects (e.g., buildings, street names, etc.) can be displayed on a screen of the client device as if they were at about the location of the computer. The map objects can be displayed alone, or parts or all of a camera image of the physical world can also be displayed. A second, subsequent image may be captured showing only the computer (e.g., encompassing more pixels of the image), indicating that the user has walked toward the computer, and thus moved toward the map objects. The physical movement of the physical camera of the client device toward the computer may be translated into a virtual movement of the client virtual camera in the map application.

At step 1150, a series of images of the 3D map may be rendered and displayed using the stream of virtual positions of the client virtual camera. In this case, the physical movement of the client device to be closer to the computer may be translated into a zoomed-in view of the three-dimensional map. Thus, movement of the client device can allow a user to control what parts of a map (e.g., a three-dimensional map) are displayed on the mobile device. This control of what is displayed on the client device may be independent of what is being displayed on the host device, in some embodiments, such that the client device can "discover" the map without cooperating with the host device.

V. SYSTEMS

Figure 12:
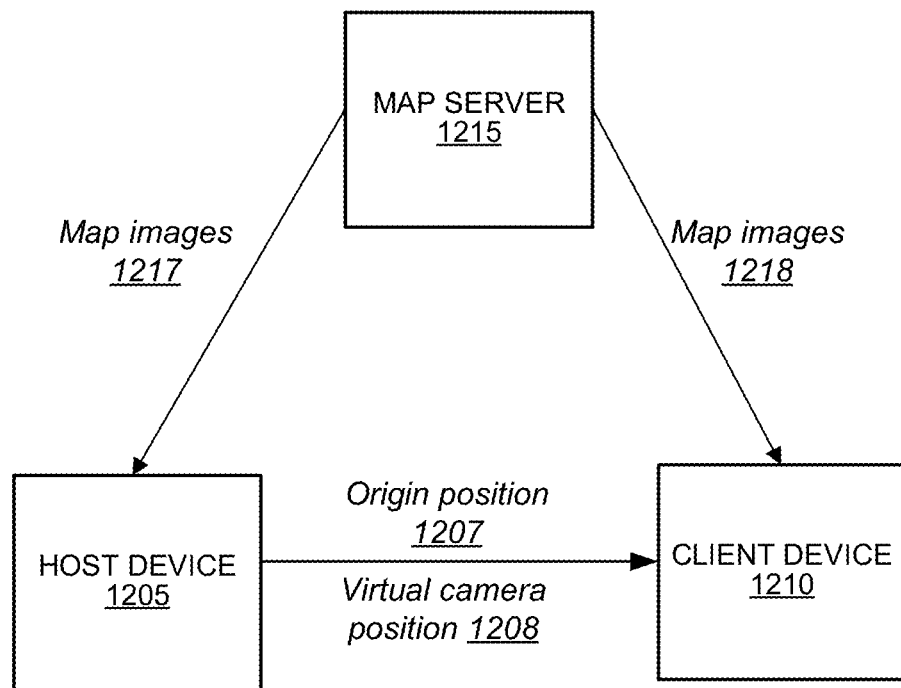
FIG. 12 shows a block diagram depicting a host device and a client device implementing cooperative map interfaces according to some embodiments of the present invention.

Various systems may be used to implement the methods described herein. FIG. 12 shows a block diagram depicting a host device 1205 and a client device 1210 implementing cooperative map interfaces according to some embodiments of the present invention. As shown in FIG. 12, the host device 1205 may download map images 1217 from a map server 1215. The map server 1215 may be any server computer and/or database storing map images. In some embodiments, the map images 1217 received from the map server 1215 may be selected based on, for example, proximity to an origin position 1207 entered by the host device 1205. The origin position 1207 may be selected, for example, based on the current position of the host device 1205, an address or coordinates entered by the host device 1205, a pin dropped on a map displayed on the host device 1205, etc. The map images 1217 may be displayed on the host device, and in some embodiments, centered on the origin position 1207.

The host device 1205 may transmit the origin position 1207 to the client device 1210. Based on the origin position 1207 (and as described above with respect to the host device 1205), the client device 1210 may also download the map images 1218 from the map server 1215. Because the map images 1218 may be downloaded from the map server 1215 instead of the host device 1205, bandwidth may be preserved between the host device 1205 and the client device 1210.

The map images 1218 may be displayed on the client device, and in some embodiments, centered on the origin position 1207.

The host device 1205 may be physically moved and/or manipulated in order to cause movement and/or manipulation of the displayed map images. In other words, the positions 1208 of a virtual camera of the host device virtually pointed at the map images may be moved and/or manipulated based on the physical movement of the host device 1205. These virtual camera positions 1208 may be transmitted to the client device 1210. The client device 1210 may then render and display the same movements of the map images using the virtual camera positions 1208 of the host device 1205.

In some embodiments, the client device 1210 may also enter a "discovery mode" in which the client device 1210 may control the map images 1218 displayed on the client device 1210, independent of the map images 1217 displayed on the host device 1205. In these embodiments, the physical camera of the client device 1210 may be used to capture initial and subsequent images of the real world (or other sensors may be used to capture movement of the client device, such as an accelerometer). Corresponding movement of the map images 1218 may be made based on the physical movement of the client device 1210. Thus, in "discovery mode", the map images 1218 displayed on the client device 1210 may be different than the map images 1217 displayed on the host device 1205, as the client device 1210 is in control of its own displayed map images 1218.

Figure 13:
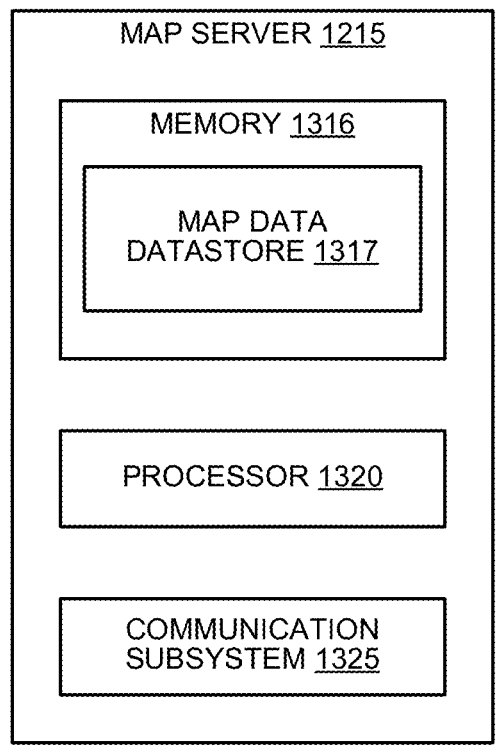
FIG. 13 shows a block diagram depicting a server computer, which may be a map server, according to some embodiments of the present invention.

FIG. 13 shows a block diagram depicting a server computer, which may be a map server 1215, according to some embodiments of the present invention. The map server 1215 may be in operative communication with one or more mobile devices (e.g., host device 1205, client device 1210, etc.), such as over one or more networks. The network may be any type of local or remote communication network, such as, for example, WiFi, Bluetooth, near field communication (NFC), a cellular network, a virtual private network (VPN), the Internet, or any other suitable network.

The map server 1215 may include a memory 1316, a processor 1320, and a communication subsystem 1325. The communication subsystem 1325 may enable the map server 1215 to communicate with mobile devices, such as host devices and client devices. The memory may include a map data datastore 1317. The map data datastore 1317 may store map data (including map images, map objects, etc.) for a plurality of locations. For example, the map data datastore 1317 may store road maps for a number of regions (e.g., states, countries, etc.). The map data may include features, such as roads, buildings, businesses, parks, landmarks, houses, trails, and the like. The map data may include maps in any number of formats (e.g., two dimensional, three dimensional, map view, satellite view, top down view, eye level view, etc.). The map data may be stored along with its associated location(s) in any suitable manner. For example, the map data may be stored in association with addresses, coordinates, names, and/or any other indicator.

Figure 14:
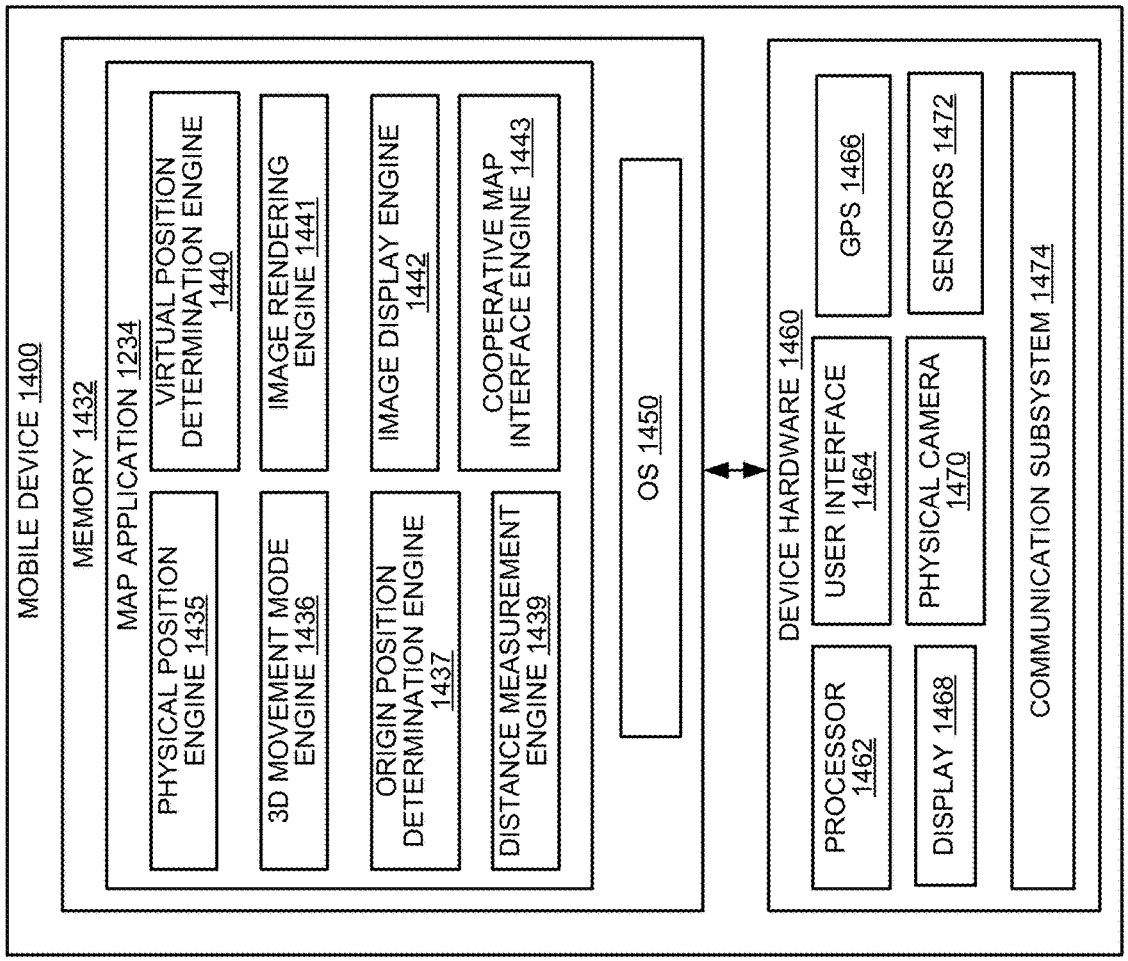
FIG. 14 shows a block diagram depicting a mobile device, which may be a host device or a client device, according to some embodiments of the present invention.

The map server 1215 may be in communication with a mobile device. FIG. 14 shows a block diagram depicting a mobile device 1400, which may be a host device or a client device as described herein, according to some embodiments of the present invention. The mobile device 1400 may include a memory 1432 and device hardware 1460. The device hardware 1460 may include a processor 1462, a user interface 1464, a global positioning system (GPS) 1466, a display 1468, a physical camera 1470, sensors 1472, and a communication subsystem 1474. In some embodiments, the display 1468 forms part of the user interface 1464. The user interface 1464 may further include input elements, such as a keyboard, a trackball, a trackpad, a mouse, a microphone, etc. The communication subsystem 1474 may include hardware components configured to allow the mobile device 1430 to communicate with the map server 1215 and with other mobile devices, such as over a network.

The memory 1432 may include an operating system (OS) 1450. The operating system 1450 may provide an interface for a user to use the mobile device 1400, e.g., to operate device hardware 1460 and to execute map application 1434. The map application 1434 may include a plurality of engines for facilitating the map functions of the mobile device 1400. For example, the map application 1434 may include a physical position engine 1435, a three-dimensional movement mode engine 1436, an origin position determination engine 1437, a distance measurement engine 1439, a virtual position determination engine 1440, an image rendering engine 1441, an image display engine 1442, and a cooperative map interface engine 1443. Although shown and described as having a certain number of separate engines, it is contemplated that the map application 1434 may include a greater or fewer number of engines, and/or that the functions of multiple engines described herein may be combined.

The physical position engine 1435 may, in conjunction with the processor 1462, request a current physical position and orientation of the mobile device 1430 from the GPS 1466 and/or one or more sensors 1472 (e.g., a compass, a gyroscope, etc.) in some embodiments. In response to the request, the GPS 1466 may generate a set of coordinates (e.g., GPS coordinates, latitude and longitude coordinates, etc.) indicative of the current location of the mobile device 1400, and provide those coordinates to the physical position engine 14235. Similarly, the sensors may generate orientation data of the mobile device 1400, and provide the orientation data to the physical position engine 1435 (e.g., a cardinal direction). The physical position engine 1435 may, in conjunction with the processor 1462 and the communication subsystem 1474, transmit the coordinates and the orientation data to the map server 1215. The map server 1215 may, in conjunction with the processor 1320, query the map data datastore 1317 with the coordinates and the orientation data to retrieve map data corresponding to the coordinates from the perspective of the orientation included in the orientation data, and transmit the map data back to the mobile device 1400 via the communication subsystem 1325.

In some embodiments, the physical position engine 1435 may receive input corresponding to a physical position via means other than the GPS 1466. For example, the physical position engine 1435 may receive an indicator of a location (e.g., an address, coordinates, a business name, etc.) via user interface 1464, which may include a physical or virtual keyboard in some embodiments. The physical position engine 1435 may then, in conjunction with the processor 1462 and the communication subsystem 1474, transmit the indicator to the map server 1215. The map server 1215 may, in conjunction with the processor 1320, query the map data datastore 1317 with the indicator to retrieve map data corresponding to the indicator, and transmit the map data back to the mobile device 1400 via the communication subsystem 1325.

Although shown and described as being stored in the map data datastore 1317, it is contemplated that in some embodiments, certain map data may be cached and stored locally on the mobile device 1400. For example, frequently used map data (e.g., map data including a home or work location) may be stored in the memory 1432, and thus may not need to be requested from the map server 1215. This may reduce data consumption by the mobile device 1400 and decrease processing time needed to display frequently used map data.

A. Registration

Once the map data has been retrieved (either locally or from the map server 1215), a map view displaying the map data may be displayed on the display 1468. The map view may include a set of map objects corresponding to a location within a map from an initial virtual position of a virtual camera. The virtual camera may have an initial virtual position of being overhead of the entered address. Exemplary map objects may include features (e.g., roads, buildings, monuments, parks, landmarks, etc.) at or around the entered location.

From the map view, the user may interact with the user interface 1464 to select a three-dimensional movement mode that uses the physical camera 1470. For example, a user may select a button on the user interface corresponding to the three-dimensional movement mode. In another example, the three-dimensional movement mode may be automatically activated upon a user's selection of a three-dimensional map or satellite view. Selection of the three-dimensional mode may activate the three-dimensional movement mode engine 1436. The three-dimensional movement mode engine 1436 may, in conjunction with the processor 1462, activate the physical camera 1470. The three-dimensional movement mode engine 1436 may capture one or more first images of a physical environment within which the mobile device 1430 resides using the physical camera 1470. In other words, once activated, the physical camera 1470 may capture an image of the environment positioned in front of and around the physical camera 1470. This image may be provided to the origin position determination engine 1437.

The origin position determination engine 1437 may, in conjunction with the processor 1462, determine an origin (i.e., initial) position of the physical camera in the physical environment using the one or more first images. For example, the origin position determination engine 1437 may analyze the images captured by the physical camera 1470 to determine that the physical camera 1470 is positioned directly in front of a tree with a blue house to the left of the tree and a red house to the right of the tree. The origin position determination engine 1437 may register the physical positions of these objects. In some embodiments, the origin position corresponds to a physical position of the physical camera 1470 when the user input is received activating the three-dimensional movement mode. In some embodiments, the origin position may default automatically at the center of the map. This origin position may be used to thereafter determine physical movement of the mobile device after activation of the three-dimensional movement mode, as described further herein.

The origin position determination engine 1437 may further, in conjunction with the processor 1462, specify a set of physical positions of a set of three dimensional objects of the map relative to the origin position. The set of three dimensional objects may correspond to the set of map objects. For example, the building indicated by the pin at "2 Embarcadero Center" of FIG. 3 may be a map object corresponding to the three dimensional building indicated by the pin at "2 Embarcadero Center" in FIG. 3. The physical position of the three dimensional building indicated by the pin in FIG. 3 relative to the origin position may be straight ahead (e.g., corresponding to the tree in the above example). The physical position of the building to the left of the pin relative to the origin position may be ahead and to the left (e.g., corresponding to the blue house in the above example). The physical position of the building to the right of the pin relative to the origin position may be head and to the right (e.g., corresponding to the red house in the above example).

In some embodiments, the set of physical positions of the set of three dimensional objects are specified at default positions and/or orientations with respect to the mobile device 1430. For example, the default positions may be dependent on the tilt angle of the mobile device 1430. In some embodiments, if the physical camera 1470 is at an angle greater than 45 degrees from face down (e.g., face up), the default positions may be at a lesser default tilt angle (e.g., 15 degrees). This may be beneficial in that it does not allow impractical or non-useful views of objects to be rendered (e.g., views of the sky). Similarly, the default positions may include default heights and/or distances from the ground or other map objects. In some embodiments, the set of physical positions of the set of three dimensional objects are specified based on angular coordinates of the mobile device 1430. These physical positions may be used to render views of the three dimensional objects, as described further herein.

B. Distance Measurement

The distance measurement engine 1439 may, in conjunction with the processor 1462, detect movement of the physical camera 1470 from the origin position. This movement may be detected using any suitable method. In some embodiments, this movement may be detected using one or more sensors 1472. The sensors may include, for example, a gyroscope, an accelerometer, a compass, and/or the like. For example, a gyroscope may indicate angular rotation of the mobile device 1400 downward. In another example, an accelerometer may indicate movement of the mobile device forward. In still another example, a compass may indicate movement of the mobile device from a north-facing position to a northeast-facing position. In still another example, a GPS 1466 may indicate movement of the mobile device 1400 from an initial position to a new position. In some embodiments, the movement detected by the sensors 1472 alone may be sufficient to determine the new physical position of the mobile device 1400, and thus the new virtual position of the virtual camera. For example, the mobile device 1400 may include an orientation sensor. An angular change between the origin position of the physical camera 1470 and the current physical position of the physical camera 1470 may be determined using the orientation sensor. The angular change may be used to determine the updated virtual position, thereby rotating the virtual camera.

In some embodiments, movement of the mobile device 1400 from the origin position may alternatively or additionally be detected by comparing subsequently captured images from the physical camera 1470 to the images taken at the origin position. In these embodiments, the distance measurement engine 1439 may, in conjunction with the processor 1462, capture one or more second images of the physical environment within which the mobile device resides using the physical camera 1470. The distance measurement engine 1439 may capture the second images after movement of the mobile device 1400.

The distance measurement engine 1439 may determine a current physical position of the physical camera 1470 with respect to the origin position based on the one or more second images. For example, the distance measurement engine 1439 may compare the first images to the second images to determine how and to what degree the physical camera 1470 has moved. For example, a first image may show a group of five trees straight ahead with a beige house to the left and brown townhomes to the right. A second image may show a group of two trees straight ahead with the beige house zoomed in to the right and a red car to the left. The distance measurement engine 1439 may analyze these images to determine that the physical camera 1470 has shifted to the left and zoomed in with respect to the origin position. The distance measurement engine 1439 may further estimate the amount of movement of the physical camera 1470, e.g., 10 feet to the left. In some embodiments, the current physical position of the physical camera 1470 is specified as a six-dimension coordinate of translation coordinates and angular coordinates.

As an example, the sensor measurements and/or images taken by the physical camera 1470 can be used to determine a movement vector relative to the initial position of the mobile device 1400. The initial position itself can be defined at a position relative to an origin, and the current position of the mobile device 1400 can be composed of these two vectors.

The sensors can be used to determine movement. For example, it can be estimated that the mobile device 1400 has moved 30 centimeters based on an accelerometer reading. The 30 centimeters can define a sphere around which the mobile device 1400 could have moved. If the accelerometer is a three-dimensional accelerometer, the direction of movement can be determined, thereby providing an estimate for the relative movement vector. The images can be analyzed to refine the position. For example, the new distance (e.g., pixels on the image) between objects can be analyzed and compared to the pixel distance for the initial image. The pixel distance can be translated to an actual distance based on camera parameters, e.g., zoom setting and depth of field analysis. The accelerometer position and the image position can be used to determine the current movement vector, e.g., by taking an average. In other embodiments, the image position can use the accelerometer position as an input, so the image analysis can start with an approximate value. In some embodiments, the image position can use a gyroscope or compass reading as input, so the image analysis can start with an approximate angular or directional orientation.

C. Map Rendering at New Position

The virtual position determination engine 1440 may, in conjunction with the processor 1462, determine an updated virtual position and orientation of the virtual camera based on the current physical position and orientation of the physical camera. The first and second images taken by the physical camera 1470 can be used to determine a movement vector relative to the initial position of the mobile device 1400. The initial position itself can be defined at a position relative to an origin, and the current position of the mobile device 1400 can be composed of these two vectors. The current position may then be used to determine an updated virtual position. For example, the virtual position determination engine 1440 may determine that the virtual camera should be shifted right and pointed downward based on the movement of the physical camera 1470 to the right and its angular movement downward. In some embodiments, the virtual position determination engine 1440 may scale the estimated amount of movement of physical camera 1470 to a different amount of movement of the virtual camera. For example, every inch of movement of the physical camera 1470 may be scaled to 10 feet of movement of the virtual camera.

The image rendering engine 1441 may, in conjunction with the processor 1462, render an image of the set of three dimensional objects based on the updated virtual position of the virtual camera. The image rendering engine 1441 may provide the rendered image to the image display engine 1442. The image display engine 1442 may, in conjunction with the processor 1462, display the rendered image on the display 1468.

D. Map Overlay on Camera Images

In some embodiments, the image display engine 1442 may overlay the rendered map image on the second images (or any subsequent images captured in real time by the physical camera 1470). In some embodiments, the image display engine 1442 may, in conjunction with the processor 1462, identify a surface in the real time images captured by the physical camera 1470. For example, the image display engine 1442 may identify a horizontal surface (or other suitable flat surface) present in the images, such as a table, a shelf, or a floor. The image display engine 1442 may overlay the rendered map image (e.g., a three-dimensional view of buildings, streets and/or other features) on the identified surface in the camera images. For example, buildings may be rendered onto the top surface of an image of a desk such that the base of the buildings appear to be positioned on the desk with the buildings protruding from the desk. The mobile device 1400 may then be moved around the desk, still pointed at the desk, and the map image may be continuously rendered to reflect the changes in position and orientation, such that the map image appears to be a three-dimensional model on the desk.

E. Cooperation Between Mobile Devices

The mobile device 1400 may be implemented by a host device and/or a client device as described herein. For example, when the mobile device 1400 is a host device, the host device may perform the functions described above with respect to FIG. 14, and may further include a cooperative map interface engine 1443. The cooperative map interface engine 1443 may, in conjunction with the processor 1462, receive an origin position of the host device from the origin position determination engine 1437, as well as a series of virtual positions of the host device from the virtual position determination engine 1440. The cooperative map interface engine 1443 may use the communication subsystem 1474 to transmit this data to a client device for rendering of map images on the client device when the client device is in a "follower mode".

In another example, the mobile device 1400 may be a client device. For example, when the client device is in a "discovery mode" or a combined mode, the client device may perform the functions described above with respect to FIG. 14, and may further include a cooperative map interface engine 1443. The cooperative map interface engine 1443 may, in conjunction with the processor 1462, receive an origin position of the host device and a series of virtual positions of the host device from the host device. The client device may toggle between following the map images displayed by the host device and independently accessing other map images, as controlled by the physical position engine 1435, the distance measurement engine 1439, the virtual position determination engine 1440, etc.

VI. EXAMPLE DEVICE

Figure 15:
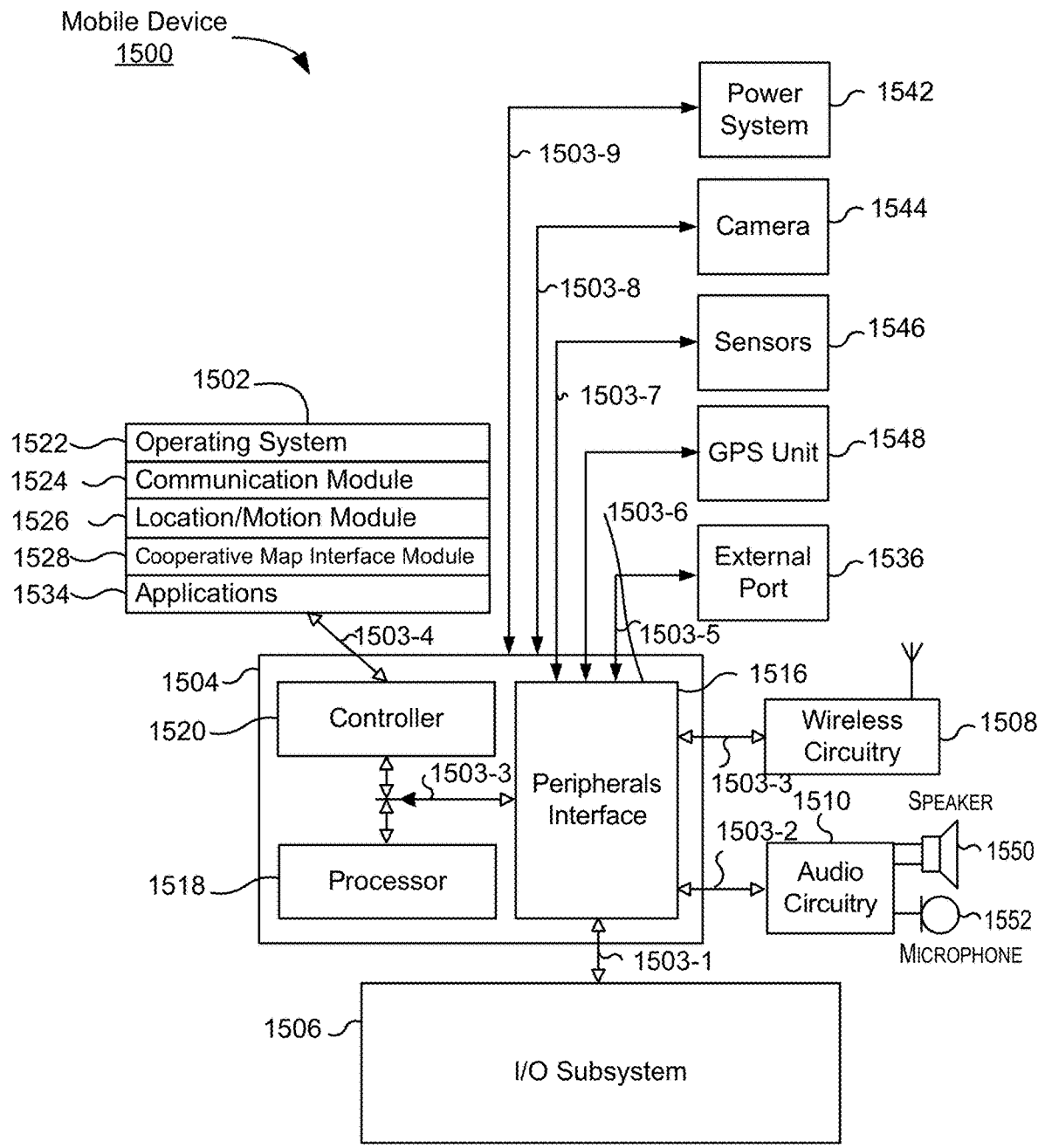
FIG. 15 shows a block diagram of an example device, which may be a mobile device, according to some embodiments of the present invention.

FIG. 15 is a block diagram of an example device 1500, which may be a mobile device (e.g., a host device or client device) as described herein. Device 1500 generally includes computer-readable medium 1502, a processing system 1504, an Input/Output (I/O) subsystem 1506, wireless circuitry 1508, and audio circuitry 1510 including speaker 1550 and microphone 1552. These components may be coupled by one or more communication buses or signal lines 1503.

Device 1500 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 15 is only one example of an architecture for device 1500, and that device 1500 can have more or fewer components than shown, or a different configuration of components. The various components shown in FIG. 15 can be implemented in hardware, software, or a combination of both hardware and software, including one or more signal processing and/or application specific integrated circuits.

Wireless circuitry 1508 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1508 can use various protocols, e.g., as described herein.

Wireless circuitry 1508 is coupled to processing system 1504 via peripherals interface 1516. Interface 1516 can include conventional components for establishing and maintaining communication between peripherals and processing system 1504. Voice and data information received by wireless circuitry 1508 (e.g., in speech recognition or voice command applications) is sent to one or more processors 1518 via peripherals interface 1516. One or more processors 1518 are configurable to process various data formats for one or more application programs 1534 stored on medium 1502.

Peripherals interface 1516 couple the input and output peripherals of the device to processor 1518 and computer-readable medium 1502. One or more processors 1518 communicate with computer-readable medium 1502 via a controller 1520. Computer-readable medium 1502 can be any device or medium that can store code and/or data for use by one or more processors 1518. Medium 1502 can include a memory hierarchy, including cache, main memory and secondary memory.

Device 1500 also includes a power system 1542 for powering the various hardware components. Power system 1542 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1500 includes a camera 1544 (e.g., a physical camera). In some embodiments, device 1500 includes sensors 1546. Sensors 1546 can include accelerometers, compasses, gyroscopes, pressure sensors, audio sensors, light sensors, barometers, and the like. Sensors 1546 can be used to sense location aspects, such as auditory or light signatures of a location.

In some embodiments, device 1500 can include a GPS receiver, sometimes referred to as a GPS unit 1548. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1518 run various software components stored in medium 1502 to perform various functions for device 1500. In some embodiments, the software components include an operating system 1522, a communication module (or set of instructions) 1524, a location module (or set of instructions) 1526, a cooperative map interface module that implements a "follower mode", a "discovery mode", and/or a combined mode, as described herein, and other applications (or set of instructions) 1534.

Operating system 1522 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1524 facilitates communication with other devices over one or more external ports 1536 or via wireless circuitry 1508 and includes various software components for handling data received from wireless circuitry 1508 and/or external port 1536. External port 1536 (e.g., USB, FireWire, Lightning connector, 60-pin connector, etc.) is adapted for coupling directly to other devices or indirectly over a network (e.g., the Internet, wireless LAN, etc.).

Location/motion module 1526 can assist in determining the current position (e.g., coordinates or other geographic location identifiers) and motion of device 1500. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1526 receives data from GPS unit 1548 and analyzes the signals to determine the current position of the mobile device. In some embodiments, location/motion module 1526 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1508 and is passed to location/motion module 1526. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1500 based on the position coordinates of the corresponding transmitters. Regardless of the specific location technology used, location/motion module 1526 receives information from which a location fix can be derived, interprets that information, and returns location information, such as geographic coordinates, latitude/longitude, or other location fix data.

The cooperative map interface module 1528 can activate automatically or in response to user input, such as a gesture, movement, and/or selection on a user interface. Once activated, the cooperative map interface module 1528 may capture image data using the camera 1544. The cooperative map interface module 1528 can determine whether the mobile device 1500 has been moved and move a virtual camera showing a map, as described further herein, and/or transmit that data to another mobile device 1500.

The one or more applications programs 1534 on the mobile device can include any applications installed on the device 1500, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1506 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1506 can include a display and user input devices such as a keyboard, mouse, and/or track pad. In some embodiments, I/O subsystem 1506 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1502) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem 1506 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1500 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

What is claimed is:

1. A method of providing a view of a three-dimensional map on a display of a client device, the method comprising performing, by the client device having a physical camera communicably coupled with the display:
    providing a user interface for a user to select a discovery mode that uses the physical camera of the client device;
    in response to a selection of the discovery mode via the user interface, wherein the discovery mode allows the client device to navigate map images including a location of a host device independently from the host device:
        capturing one or more first images of a physical environment within which the client device resides using the physical camera;
        determining an initial position and an initial orientation of the physical camera in the physical environment at a time when the discovery mode is selected by using the one or more first images;
        specifying a set of physical positions of a set of three-dimensional objects of the three-dimensional map relative to the initial position based on an origin position from the host device, the set of three-dimensional objects received from a map server;
        generating a first stream of virtual positions of a client virtual camera corresponding to the client device based on physical movement of the client device as measured by comparing a second position and a second orientation of the physical camera relative to one or more second images from the physical camera; and
        rendering and displaying a series of images of the three-dimensional map using the first stream of virtual positions of the client virtual camera and the set of physical positions of the set of three-dimensional objects of the three-dimensional map, wherein the rendering and displaying the series of images includes:
            obtaining a current position of the host device; and
            rendering and displaying an icon on the series of images of the three-dimensional map, the icon indicating a current virtual camera position of the host device in the three-dimensional map.

2. The method of claim 1, further comprising:
    receiving a geographic indicator from the host device that indicates a current virtual camera orientation of the host device; and
    rendering and displaying the geographic indicator as part of the icon in the three-dimensional map, wherein the client device retrieves a set of map objects corresponding to a region of the three-dimensional map based on the geographic indicator.

3. The method of claim 2, wherein the geographic indicator includes the origin position.

4. The method of claim 1, further comprising:
receiving, over a network, a second stream of virtual positions of a host virtual camera corresponding to the host device in the three-dimensional map, wherein the second stream of virtual positions are relative to the origin position and are generated by physical movement of the host device; and
rendering and displaying a trace of the second stream of virtual positions of the host virtual camera on the three-dimensional map.

5. The method of claim 4, further comprising:
rendering and displaying a trace of the first stream of virtual positions of the client virtual camera.

6. The method of claim 1, wherein the set of three-dimensional objects are retrieved from the map server over a first network, wherein the origin position and the first stream of virtual positions are received at the client device over a second network, and wherein the first network and the second network are different.

7. The method of claim 1, further comprising:
receiving a selection of a follower mode via the user interface; and
in response to the selection of the follower mode via the user interface:
receiving, over a network, a third stream of virtual positions of a host virtual camera corresponding to the host device in the three-dimensional map, wherein the third stream of virtual positions are relative to the origin position and are generated by physical movement of the host device; and
rendering and displaying a third series of images of the three-dimensional map using the third stream of virtual positions of the host device.

8. A mobile client device comprising:
a display;
a physical camera communicably coupled with the display;
a processor; and
a memory coupled to the processor, the memory storing instructions, which when executed by the processor, cause the mobile client device to perform operations including:
providing a user interface for a user to select a discovery mode that uses the physical camera of the mobile client device;
in response to a selection of the discovery mode via the user interface, wherein the discovery mode allows the mobile client device to navigate map images including a location of a host device independently from the host device:
capturing one or more first images of a physical environment within which the mobile client device resides using the physical camera;
determining an initial position and an initial orientation of the physical camera in the physical environment at a time when the discovery mode is selected by using the one or more first images;
specifying a set of physical positions of a set of three-dimensional objects of a three-dimensional map relative to the initial position based on an origin position from the host device, the set of three-dimensional objects received from a map server;
generating a first stream of virtual positions of a client virtual camera corresponding to the mobile client device based on physical movement of the mobile client device as measured by comparing a second position and a second orientation of the physical camera relative to one or more second images from the physical camera; and
rendering and displaying a series of images of the three-dimensional map using the first stream of virtual positions of the client virtual camera and the set of physical positions of the set of three-dimensional objects of the three-dimensional map, wherein the rendering and displaying the series of images includes:
obtaining a current position of the host device; and
rendering and displaying an icon on the series of images of the three-dimensional map, the icon indicating a current virtual camera position of the host device in the three-dimensional map.

9. The mobile client device of claim 8, further comprising:
receiving a geographic indicator from the host device that indicates a current virtual camera orientation of the host device; and
rendering and displaying the geographic indicator as part of the icon in the three-dimensional map, wherein the mobile client device retrieves the set of three-dimensional objects corresponding to a region of the three-dimensional map based on the geographic indicator.

10. The mobile client device of claim 9, wherein the geographic indicator includes the origin position.

11. The mobile client device of claim 8, further comprising:
receiving, over a network, a second stream of virtual positions of a host virtual camera corresponding to the host device in the three-dimensional map, wherein the first stream of virtual positions are relative to the origin position and are generated by physical movement of the host device; and
rendering and displaying a trace of the second stream of virtual positions of a host virtual camera on the three-dimensional map.

12. The mobile client device of claim 11, further comprising:
rendering and displaying a trace of the first stream of virtual positions of the client virtual camera.

13. The mobile client device of claim 8, wherein the set of three-dimensional objects are retrieved from the map server over a first network, wherein the origin position and the first stream of virtual positions are received at the mobile client device over a second network, and wherein the first network and the second network are different.

14. The mobile client device of claim 8, further comprising:
receiving a selection of a follower mode via the user interface; and
in response to the selection of the follower mode via the user interface:
receiving, over a network, a third stream of virtual positions of a host virtual camera corresponding to the host device in the three-dimensional map, wherein the third stream of virtual positions are relative to the origin position and are generated by physical movement of the host device; and rendering and displaying a third series of images of the three-dimensional map using the third stream of virtual positions of the host device.

15. A non-transitory computer readable medium storing a plurality of instructions that, when executed by one or more processors of a client device, cause the one or more processors to perform operations for providing a view of a three-dimensional map on a display of a client device having a physical camera communicably coupled with the display, the operations comprising:
provinding a user interface for a user to select a discovery mode that uses the physical camera;
in response to a selection of the discovery mode via the user interface, wherein the discovery mode allows the client device to navigate map images including a location of a host device independently from the host device:
capturing one or more first images of a physical environment within which the client device resides using the physical camera;
determining an initial position and an initial orientation of the physical camera in the physical environment at a time when the discovery mode is selected by using the one or more first images;
specifying a set of physical positions of a set of three-dimensional objects of the three-dimensional map relative to the initial position based on an origin position from the host device, the set of three-dimensional objects received from a map server;
generating a first stream of virtual positions of a client virtual camera corresponding to the client device based on physical movement of the client device as measured by comparing a second position and a second orientation of the physical camera relative to one or more second images from the physical camera; and
rendering and displaying a series of images of the three-dimensional map using the first stream of virtual positions of the client virtual camera and the set of physical positions of the set of three-dimensional objects of the three-dimensional map, wherein the rendering and displaying the series of images includes:
obtaining a current position of the host device; and
rendering and displaying an icon on the series of images of the three-dimensional map, the icon indicting a current virtual camera position of the host device in the three-dimensional map.

16. The non-transitory computer readable medium of claim 15, wherein the operations further comprise:
receiving a geographic indicator from the host device that indicates a current virtual camera orientation of the host device; and
rendering and displaying the geographic indicator as part of the icon in the three-dimensional map, wherein the client device retrieves the set of three-dimensional objects corresponding to a region of the three-dimensional map based on the geographic indicator.

17. The non-transitory computer readable medium of claim 16, wherein the geographic indicator includes the origin position.

18. The non-transitory computer readable medium of claim 15, wherein the operations further comprise:
receiving, over a network, a second stream of virtual positions of a host virtual camera corresponding to the host device in the three-dimensional map, wherein the second stream of virtual positions are relative to the origin position and are generated by physical movement of the host device; and
rendering and displaying a trace of the second stream of virtual positions of the host virtual camera on the three-dimensional map.

19. The non-transitory computer readable medium of claim 18, wherein the operations further comprise:
rendering and displaying a trace of the first stream of virtual positions of the client virtual camera.

20. The non-transitory computer readable medium of claim 15, wherein the operations further comprise:
receiving a selection of a follower mode via the user interface; and
in response to the selection of the follower mode via the user interface:
receiving, over a network, a third stream of virtual positions of a host virtual camera corresponding to the host device in the three-dimensional map, wherein the third stream of virtual positions are relative to the origin position and are generated by physical movement of the host device; and
rendering and displaying a third series of images of the three-dimensional map using the third stream of virtual positions of the host device.

* * * * *